United States Patent
Ly et al.

(10) Patent No.: US 8,744,082 B2
(45) Date of Patent: Jun. 3, 2014

(54) SYSTEM AND METHOD FOR SECURING WIRELESS COMMUNICATIONS

(75) Inventors: Hung D. Ly, College Station, TX (US);
Yufei Blankenship, Kildeer, IL (US);
Tie Liu, Sugar Land, TX (US)

(73) Assignee: Futurewei Technologies, Inc., Plano, TX (US)

( * ) Notice: Subject to any disclaimer, the term of this patent is extended or adjusted under 35 U.S.C. 154(b) by 249 days.

(21) Appl. No.: 12/938,841

(22) Filed: Nov. 3, 2010

(65) Prior Publication Data

US 2012/0106739 A1 May 3, 2012

(51) Int. Cl.
*H04K 1/00* (2006.01)

(52) U.S. Cl.
USPC ........... 380/270; 380/279; 375/222; 375/226; 375/269; 375/273; 375/308; 341/54; 370/516

(58) Field of Classification Search
USPC .......... 380/270; 375/222, 226, 269, 273, 308; 341/54; 370/516
See application file for complete search history.

(56) References Cited

U.S. PATENT DOCUMENTS

| | | | |
|---|---|---|---|
| 2004/0213225 A1* | 10/2004 | Coffey | 370/389 |
| 2006/0227748 A1 | 10/2006 | Stamoulis et al. | |
| 2006/0285503 A1 | 12/2006 | Mese et al. | |
| 2007/0058808 A1 | 3/2007 | Rudolf et al. | |
| 2007/0165845 A1* | 7/2007 | Ye et al. | 380/30 |
| 2007/0177729 A1* | 8/2007 | Reznik et al. | 380/44 |
| 2008/0008264 A1* | 1/2008 | Zheng | 375/299 |
| 2008/0069251 A1 | 3/2008 | Imai et al. | |
| 2008/0090572 A1* | 4/2008 | Cha et al. | 455/436 |
| 2008/0304658 A1* | 12/2008 | Yuda et al. | 380/44 |
| 2009/0228598 A1* | 9/2009 | Stamoulis et al. | 709/230 |
| 2010/0067701 A1* | 3/2010 | Patwari et al. | 380/279 |
| 2011/0044494 A1* | 2/2011 | Bradley et al. | 382/100 |
| 2011/0078453 A1* | 3/2011 | Mueck et al. | 713/179 |
| 2011/0098004 A1* | 4/2011 | Takaoka et al. | 455/67.11 |
| 2011/0141845 A1* | 6/2011 | Peacock et al. | 367/13 |

OTHER PUBLICATIONS

International Search Report recieved in Patent Cooperation Treaty Application No. PCT/US2011/059161, mailed Feb. 10, 2012, 2 pages.
Lai, Lifeng, et al., "A Unified Framework for Key Agreement Over Wireless Fading Channels," 2009 IEEE Information Theory Workshop, Oct. 11-16, 2009, pp. 100-104.

(Continued)

*Primary Examiner* — Ashok Patel
*Assistant Examiner* — Gary Gracia
(74) *Attorney, Agent, or Firm* — Slater & Matsil, L.L.P.

(57) ABSTRACT

A system and method for securing wireless communications are provided. A method for secure communications by a first user includes estimating a channel between the first user and a second user based on a pilot signal transmitted by the second user, determining a first threshold and a second threshold based on the estimate of channel, selecting a first subset of channel estimates, signaling the first subset of channel estimates to the second user, receiving a second subset of channel estimates from the second user, for each channel estimate in the second subset of channel estimates, quantizing the channel estimate based on a relationship between a gain of the channel estimate and the first threshold and the second threshold, generating a first secret key based on quantized channel estimates, verifying that the first secret key matches a second secret key generated by the second user, and transmitting information to the second user.

29 Claims, 13 Drawing Sheets

(56) References Cited

OTHER PUBLICATIONS

Written Opinion of the International Searching Authority received in Patent Cooperation Treaty Application No. PCT/US2011/059161, mailed Feb. 10, 2012, 7 pages.

Ahlswede, R., et al., "Common Randomness in Information Theory and Cryptography—Part I: Secret Sharing," IEEE Transactions on Information Theory, vol. 39, No. 4, Jul. 1993, pp. 1121-1132.

Hassan, A.A., et al., "Cryptographic Key Agreement for Mobile Radio," Digital Signal Processing, Article No. 0023, 1996, pp. 207-212.

Mathur, S., et al., "Radio-telepathy: Extracting a Secret Key from an Unauthenticated Wireless Channel," ACM, 2008, 12 pages.

Maurer, U.M., et al., "Secret Key Agreement by Public Discussion from Common Information," IEEE Transactions on Information Theory, vol. 39, No. 3, May 1993, pp. 733-742.

Sayeed, A., et al., "Secure Wireless Communications: Secret Keys Through Multipath," ICASSP, 2008, 4 pages.

Shannon, C.E., "Communication Theory of Secrecy Systems," A Mathematical Theory of Cryptography, Sep. 1, 1946, pp. 657-715.

Ye, C., et al., "Information-Theoretically Secret Key Generation for Fading Wireless Channels," IEEE Transactions on Information Forensics and Security, vol. 5, No. 2, Jun. 2010, pp. 240-254.

"Extended European Search Report," Application No. 11838814.9, Applicant: Huawei Technologies Co., Ltd., mailing date: Jul. 11, 2013, 12 pages.

Wallace, "Secure Physical Layer Key Generation Schemes: Performance and Information Theoretic Limits," IEEE, Jun. 14, 2009, pp. 1-5.

* cited by examiner

SYSTEM AND METHOD FOR SECURING WIRELESS COMMUNICATIONS

TECHNICAL FIELD

The present invention relates generally to wireless communications, and more particularly to a system and method for securing wireless communications.

BACKGROUND

Broadcasting is inherent to wireless communications. Any receiver operating within range of a transmission may be able to listen to the transmission and may be able to decode at least a portion of the transmission. The broadcast nature of wireless communications may be exploited to allow simultaneous transmissions to several receivers at high rates. However, eavesdropping may also become easier.

Cryptography is a traditional approach to protect transmissions against eavesdropping. In general, there are two different types of cryptographic systems: secret key cryptosystems and public-key cryptosystems. Secret key cryptosystems require a secret key shared between a sender and a receiver. Public-key cryptosystems do not require the pre-establishment of a secret key, but may be more susceptible to advanced attacks, such as man-in-the-middle attack. Both types of cryptosystems may be based on an assumption that the eavesdropper has limited computational power. For example, in the well-known RSA public-key cryptosystem, the security is based on the computational complexity involved in factoring large integers, while many other cryptosystems are based on the difficulty of computing discrete logarithms in certain groups. Therefore, traditional cryptosystems lack absolute security since given enough time and computation power, they may be broken.

FIG. 1 illustrates a prior art cipher system 100. Cipher system 100 may be illustrative of a Shannon cipher system. Shannon defined a secrecy system to be perfectly secret if the cipher text is statistically independent of the message. Perfect secrecy is the strongest notion of security since observing the cipher text does not reveal any information regarding the message. In cipher system 100, assumptions include: 1) transmitter 105 and receiver 110 share a secret key that is unknown to eavesdropper 115; 2) transmission of the message is noiseless to both receiver 110 and eavesdropper 115. Under these assumptions, cipher system 100 may be shown to have perfect secrecy if the length of the secret key is at least as long as that of the message.

Shannon's result on perfect secrecy systems presents is pessimistic. It has been shown that Shannon's pessimistic result is not due to the strong notion of information-theoretic security, but is a result of the assumption that the transmission of the message occur over noiseless channels. By extending the Shannon cipher system to a noisy setting, it may be possible to design cipher systems that can deliver a message reliably to a receiver while keeping it asymptotically perfectly secret from an eavesdropper without the need for a secret key shared initially.

In fact, it has been shown that if the transmitter and the receiver can observe a common noisy channel, they may exploit the inherent noisiness of a channel to generate a secret key that may be used to encrypt messages sent over the channel. Furthermore, if the transmitter and the receiver can communicate over an error-free public channel (herein referred to as public communications), they can generate the same secret keys with high probability. However, when communicating over a public channel, no significant knowledge about the secret key may be revealed. In other words, obtaining publicly communicated information must not provide the eavesdropper knowledge about the secret key.

SUMMARY OF THE INVENTION

These and other problems are generally solved or circumvented, and technical advantages are generally achieved, by preferred embodiments of the present invention which provide a system and method for securing wireless communications.

In accordance with a preferred embodiment of the present invention, a method for secure communications by a first user is provided. The method includes estimating a channel between the first user and a second user, thereby producing a first channel estimate comprising a first gain estimate and a first phase estimate of the channel, transmitting a first public information regarding the first channel estimate to the second user, and generating a first block of secret bits based on the first channel estimate.

In accordance with another preferred embodiment of the present invention, a method for secure communications by a second user is provided. The method includes receiving a first public information from a first user, estimating a channel between the second user and the first user, thereby producing a second channel estimate comprising a second gain estimate and a second phase estimate of the channel, and generating a second block of secret bits based on the first public information and the second gain estimate and the second phase estimate of the channel.

In accordance with another preferred embodiment of the present invention, a communications device is provided. The communications device includes a channel estimate unit, a threshold unit coupled to the channel estimate unit, a channel select unit coupled to the channel estimate unit, and a key generate unit coupled to the channel estimate unit. The channel estimate unit estimates a channel between the communications device and a remote communications device, the threshold unit determines one or more thresholds based on the channel estimate, the channel select unit selects channel estimates, and the key generate unit generate secret bits based on a gain of the channel estimate and a phase of the channel estimate.

In accordance with another preferred embodiment of the present invention, a device for secure communications is provided. The device includes a channel estimator, a transmitter, and a generator. The channel estimator estimates a channel between the device and a second device, thereby producing a first channel estimate comprising a first gain estimate and a first phase estimate of the channel. The transmitter transmits a first public information regarding the first channel estimate to the second device, and the generator generates a first block of secret bits based on the first channel estimate.

In accordance with another preferred embodiment of the present invention, a device for secure communications is provided. The device includes a receiver, a channel estimator, and a generator. The receiver receives a first public information from a second device, the channel estimator estimates a channel between the second device and the device, thereby producing a second channel estimate comprising a second gain estimate and a second phase estimate of the channel, and the generator generates a second block of secret bits based on the first public information and the second gain estimate and the second phase estimate of the channel.

An advantage of an embodiment is that a technique for generating a shared secret key at both a transmitter and a receiver using channel gain and/or channel phase information of the wireless channel. The technique ensures that the transmitter and the receiver are able to generate identical secret keys with high probability. The use of channel gain and/or channel phase information may help to generate a greater number of secret bits per time unit (referred to as secret key generation rate or secrecy rate) than the use of the channel gain or the phase of the channel alone.

Another advantage of an embodiment is that the technique used in the generation of the secret key may be adaptable based on channel conditions. For example, while channel conditions are poor, only channel gain is used to generate the secret key. However, when channel conditions are good, both channel gain and channel phase are used to generate the secret key, thereby increasing the secret key generation rate when channel conditions permit.

A further advantage of an embodiment is that the technique for generating the secret key from both channel gain and phase of the channel yields a secret key with a higher degree of randomness than that from channel gain only, making it difficult for an eavesdropper to determine the secret key or otherwise intercepting and deciphering messages transmitted using the secret key.

Yet another advantage of an embodiment is that the eavesdropper may be able to at the very most obtain a negligible amount of information about the secret key, thereby allowing the secret key to be used for a longer period of time, reducing a need to frequently update the secret key.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wireless communications system wherein there is a desire to provide secure communications between users of the wireless communications system.

Figure 1:
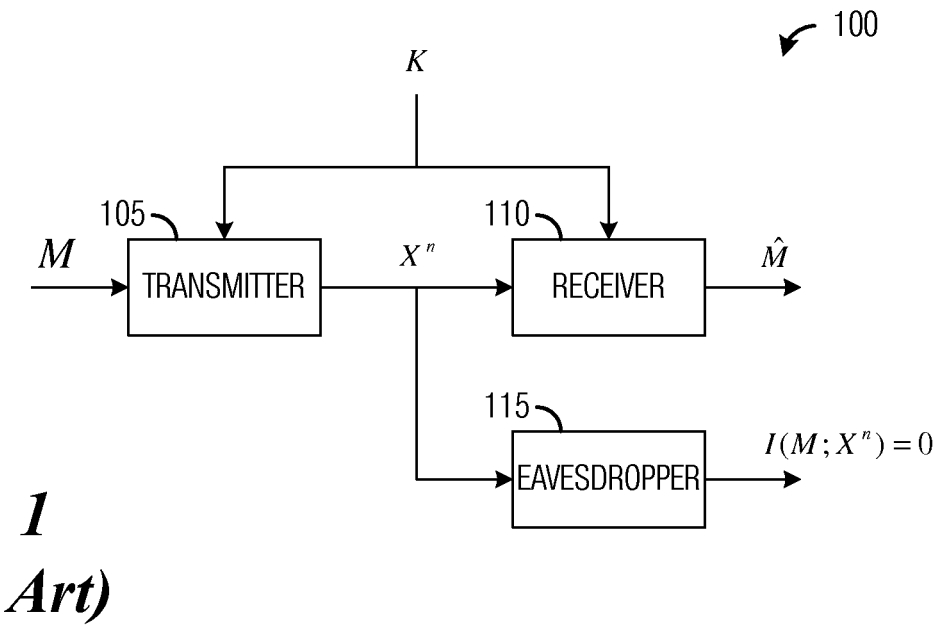
FIG. 1 is a diagram of a prior art cipher system.
Figure 2:
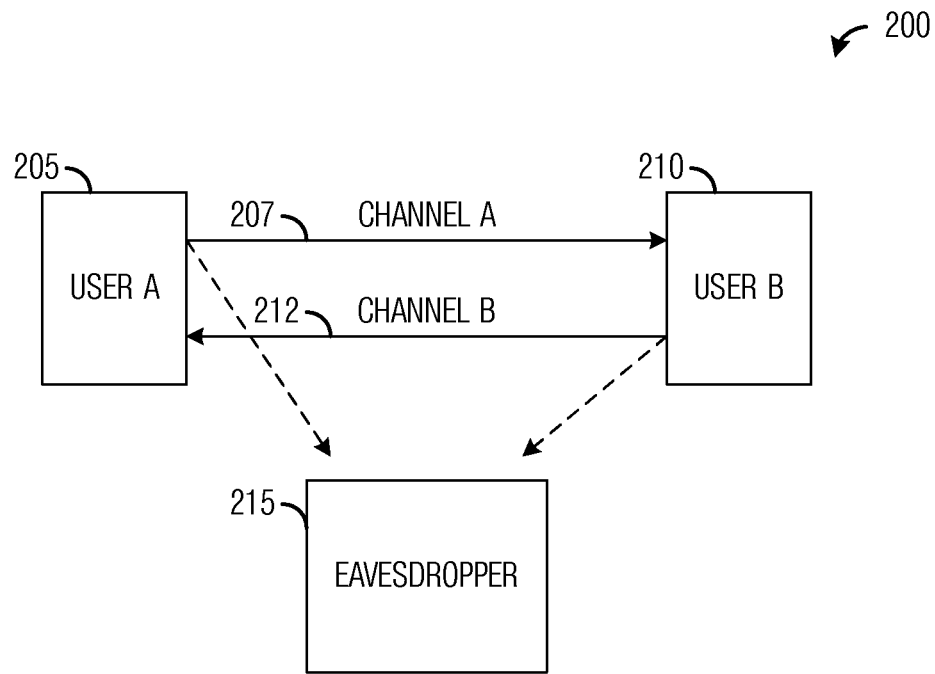
FIG. 2 is a diagram of a wireless communications system.

FIG. 2 illustrates a wireless communications system 200. Consider that wireless communications system 200 is a time-division duplex wireless communications system that includes two users, a user A 205 and a user B 210 with a channel A 207 between user A 205 and user B 210 and a channel B 212 between user B 210 and user A 205. User A 205 and user B 210 desire to have secure communications over channel A 207 and channel B 212. Wireless communications system 200 also includes an eavesdropper 215 that is desirous to intercept at least some of the communications between user A 205 and user B 210.

User A 205 and user B 210 may start communications by probing channels B 212 and A 207, respectively. Since wireless communications system 200 is a time-division duplex system, user A 205 and user B 210 may not be able to probe channels B 212 and A 207 at the same time. As an example, at a first time, user A 205 may transmit a pilot signal to user B 210 over channel A 207 and user B 210 may estimate channel A 207 based on the received pilot signal from user A 205. Similarly, at a second time, user B 210 may transmit a pilot signal to user A 205 over channel B 212 and user A 205 may estimate channel B 212 based on the received pilot signal from user B 210.

Assume that channel A 207 and channel B 212 are flat fading channels. Received signals at user A 205 and user B 210 due to the channel probes may be expressed as $$Y_a[m_1] = h_{ab} X_a[m_1] + Z_a[m_1] \quad (3.1)$$

and $$Y_b[m_2] = h_{ba} X_b[m_2] + Z_b[m_2], \quad (3.2)$$

where $Y_a$ is the received channel at user A 205 and $Y_b$ is the received channel at user B 210, $Z_i[m_i]$, $i \in \{a,b\}$, are independently identically distributed (i.i.d.) additive Gaussian noise with zero mean and variance $\sigma_i^2$, $X_i$ is the pilot signal, and $h_{ab}$ and $h_{ba}$ are the channel impulse responses of the uplink (from user A 205 to user B 210) and downlink (from user B 210 to user A 205) channels, respectively.

The channels (channel A 207 and channel B 212) are considered to be rich scattering fading channels, and eavesdropper 215 is at least half a wavelength away from user A 205 and user B 210. Due to the spatial decorrelation property of time-varying channels, eavesdropper 215 will observe channels that are statistically independent of those between user A 205 and user B 210. As a result, given the pilot signals, eavesdropper 215 may be unable to obtain any useful knowledge about the channel estimates of users A 205 and B 210.

Consider a point-to-point communications system where a transmitter transmits a pilot signal X[m] to a receiver over a wireless channel. Assume that the wireless channel is a flat fading channel. At the receiver, the received signal may be expressed as $$Y[m]=h[m]X[m]+Z[m] \qquad (3.3)$$

where the pilot signal is of power P, h[m] is a sample of the wireless channel at time m with variance $\sigma_h^2$, and N[m] is an additive Gaussian noise with mean zero and variance $\sigma^2$.

If a minimum mean square error (MMSE) estimator is used, the channel estimate may be computed as $$\hat{h}[m] = \frac{\sigma_h^2}{\sigma_h^2 P + \sigma^2} X^T[m]Y[m]. \qquad (3.4)$$

Furthermore, assume that the channel gain is normalized, i.e., $\sigma_h^2=1$, and denote the signal-to-noise ratio (SNR) as $$SNR = \frac{P}{\sigma^2}.$$

The channel estimate may be expressed as $$\hat{h}[m] = \frac{SNR}{1+SNR}h[m] + \frac{X^T[m]N[m]}{(1+SNR)\sigma^2} \qquad (3.5)$$

and the minimum estimation error is expressible as $$\frac{1}{1+SNR}.$$

Therefore, the channel estimation may be modeled as $$\hat{h}[m]=h[m]+\Delta h[m], \qquad (3.6)$$

where $\Delta h[m]$ is an estimation error.

Assume that the wireless channels are Rayleigh fading, which may be characterized by a complex Gaussian random variable with zero-mean and unit variance. The estimation error may be modeled by a complex Gaussian random variable with zero mean and variance $$\frac{1}{1+SNR}.$$

Therefore, the channel estimates at the legitimate users (i.e., the receiver and t may be modeled as $$\hat{h}_a[m]=h_a[m]+\Delta h_a[m],$$

and $$\hat{h}_b[m]=h_b[m]+\Delta h_b[m], \qquad (3.7)$$

where $\Delta h_a[m]$ and $\Delta h_b[m]$ are i.i.d complex Gaussian random variables with a zero mean and variance $$\frac{1}{1+SNR}.$$

Note that legitimate users (e.g., user 205 and user 210) access the wireless channel in different time slots and may have different channel estimation errors. Consequently, with high probability, the channel estimates at the legitimate users may not be similar. However, the reciprocity property of the electromagnetic waves ensures that the legitimate users can observe a similar channel response, i.e., $h_a[m_1]=h_b[m_2]$, as long as the legitimate users send the pilot signals to each other at a sufficiently fast rate. Hence, the estimated channel samples at the legitimate users are highly correlated, so are their estimated phases, and so are the estimated channel gain. Consequently, the estimated phases and gain may be viewed as a common randomness that user 205 and user 210 can take advantage of to generate a secret key shared between them.

According to an embodiment, it may be possible to generate secret keys from a wireless channel between legitimate users using the channel's gain, the channel's phase, or both the channel's gain and phase, wherein the technique used may be dependent upon the channel's condition. For example, if the channel's condition is poor, then the channel's gain may be used to generate the secret keys. While if the channel's condition is good, then both the channel's gain and phase may be used to generate the secret keys. The adaptability of the secret key generation technique to the channel condition may help to ensure that it is able to generate secret keys in any channel condition.

In general, the phase of a channel with high gain is more robust to phase change than that of a channel with low gain. Therefore, channel gain may serve as an indicator to select a secret key generating technique. Furthermore, a channel's phase changes faster than the channel's gain, hence a secret key extracted from both channel gain and phase may be more random than a secret key generated from channel gain only. Additionally, secret keys generated from both channel gain and phase may be generated at a higher secrecy rate than those generated from channel gain or channel phase alone.

Figure 3:
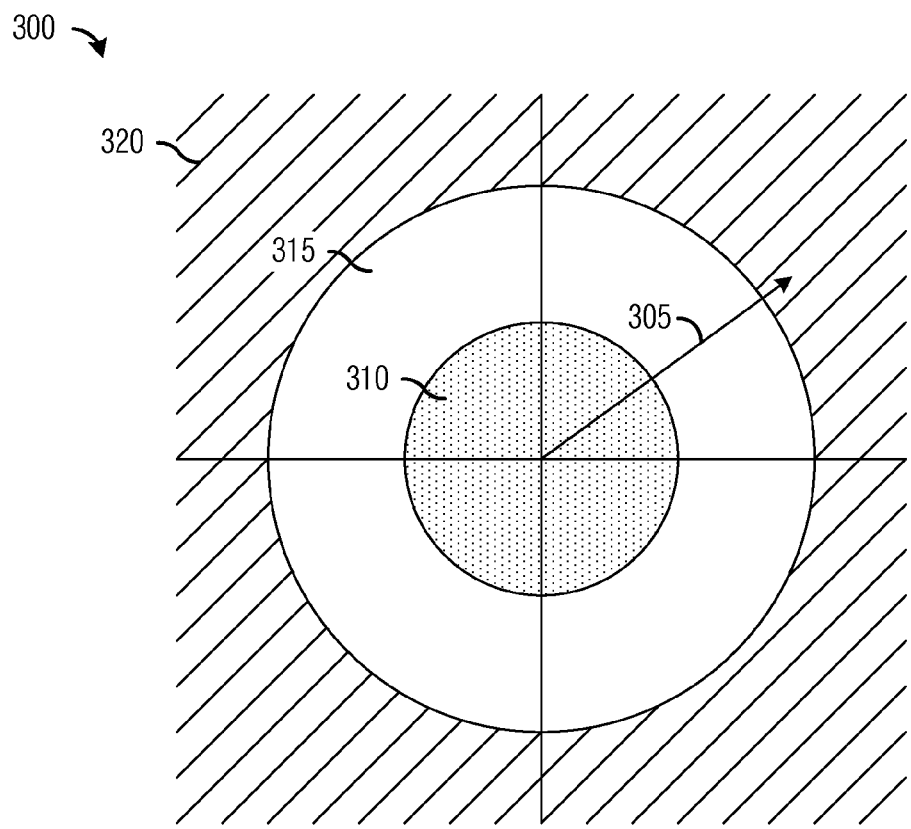
FIG. 3 is a quantization diagram for use in quantizing channel information (e.g., channel gain, channel phase, or channel gain and phase) into a bit sequence for secret key generation.

FIG. 3 illustrates a channel decision diagram 300 for use in quantizing channel information (e.g., channel gain, channel phase, or channel gain and phase) into a bit sequence for secret key generation. As shown in FIG. 3, a vector, such as vector 305, may represent a channel estimate and may indicate both a magnitude of the channel estimate (length of the vector) and a phase of the channel estimate (angle of the vector).

Channel decision diagram 300 includes three distinct regions: region 310, region 315, and region 320. Region 310 may represent a low channel quality region and if a vector falls within region 310, only the channel gain (represented by the length of the vector) is quantized to produce a secret bit sequence for secret key generation. Region 320 may represent a high channel quality region and if a vector falls within region 320, both the channel gain (length of the vector) and the channel phase (represented by the angle of the vector) are quantized to produce a secret bit sequence for secret key generation. Region 315 may represent a medium channel quality region and if a vector falls within region 315, the vector is not used for secret key generation. Region 315 may be used as a guard band to make the quantization of the channel estimates more resilient to channel estimation errors.

However, if region 315 is too large, then a significant number of channel estimates may be needlessly discarded.

Dimensions of the regions may be determined based on a number of factors, such as, desired secrecy rate, expected channel estimation error and desired immunity to channel estimation error, expected channel condition, and so forth. For example, if the expected channel estimation error is high, then the dimensions of the regions may be adjusted so that region 315 is large to help increase immunity to channel estimation error. Similarly, if desired immunity to channel estimation error is high, then region 315 may be set to a large value. While, if a desired secrecy rate is high, the regions may be adjusted to that a majority of the channel estimate falls within region 320.

Although channel decision diagram 300 illustrates three distinct regions, a different number of regions may be used. For example, two, three, four, five, and so forth, regions may be used in a channel decision diagram. Therefore, a discussion of three distinct regions should not be construed as being limiting to either the spirit or the scope of the embodiments.

In order to map selected channel gains into a bit sequence for secret key generation, legitimate users may separately compute upper and lower thresholds based on the channel gain measurements. As an example, the upper threshold $q_u$ and the lower threshold $q_l$ can be computed as $$q_u = E[X] + \alpha \sigma[X]$$

and $$q_l = E[X] - \alpha \sigma[X]$$

Here, X can be the channel sample vector observed by user A 205 or user B 210, E[X] is the expected value of X, and σ[x] is the standard deviation of X. Note that α is a system parameter that can be chosen to optimize the performance of the secret key generation technique. For each chosen channel gain sample, a binary quantization is simply done as follows $$Q(x) = \begin{cases} 1 & \text{if } x > q_u \\ 0 & \text{if } x < q_l. \end{cases}$$

Figure 4:
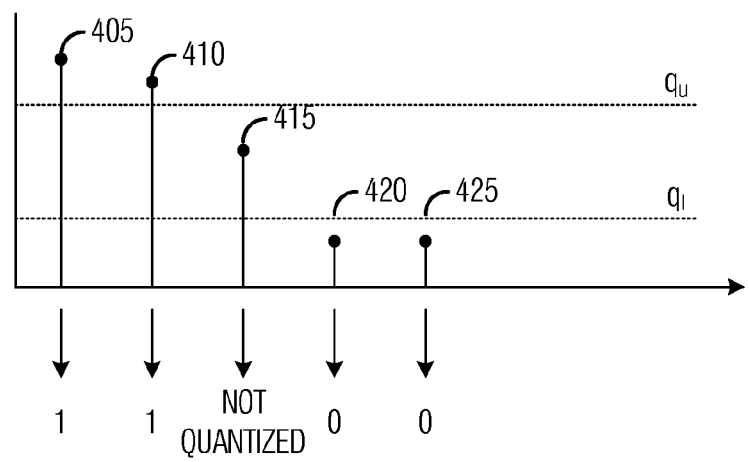
FIG. 4 is a diagram of a binary quantization of a number of channel gain estimates.

FIG. 4 illustrates a binary quantization of a number of channel gain estimates. As shown in FIG. 4, channel gain samples 405 and 410 may be quantized to binary values 1 and 1, channel gain sample 415 is not quantized, and channel gain samples 420 and 425 may be quantized to binary values 0 and 0. As discussed previously, channel gain sample 415 is not quantized since it lies between the upper threshold $q_u$ and the lower threshold $q_l$.

Although the above channel gain quantization illustrates a binary quantization wherein a channel gain sample is quantized to either a first value or a second value based on its value, channel gain quantization may quantize a channel gain sample into a multi-bit value. As an example, a channel gain sample may be quantized to one of four values (two bits or tertiary quantization). With tertiary quantization, a total of seven zones may be needed with one zone per value and a guard band between each of the zones. Therefore, the illustration of binary quantization should not be construed as being limiting to either the scope or the spirit of the embodiments.

Figure 5A:
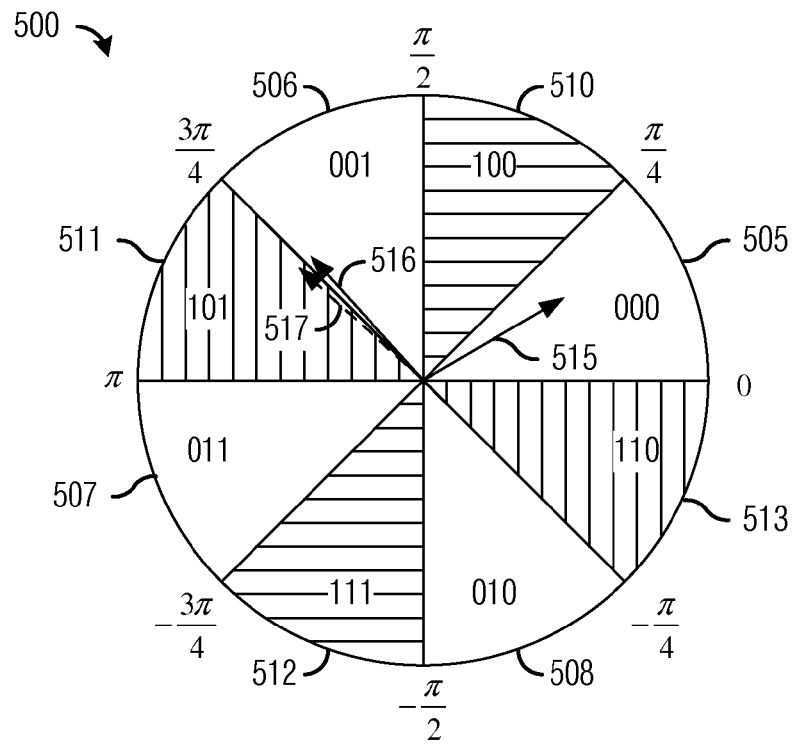
FIG. 5a is a phase quantization diagram for use in quantizing channel phase estimates with public communications.

FIG. 5a illustrates a phase quantization diagram 500 for use in quantizing channel phase estimates with public communications. Quantizing channel phase estimates with public communications makes use of a public exchange of information to help reduce a probability that an estimated phase projects onto an incorrect subspace, thereby compensating for the negative effects of imperfect channel estimation.

Phase quantization diagram 500 includes Q=eight ($2^k$ with k=3) bins, with each bin spanning $$\frac{\pi}{4}$$

radians. However, instead of using all eight bins to quantize an estimated phase, the eight bins may be partitioned into $2^m$ groups of bins with each bin comprising $2^{k-m}$ bins, where m is less than k. As shown in FIG. 5a, k=3 and m=1. Rather than selecting contiguous bins for placement into each of the $2^m$ groups, the bins are selected so that the bins within a group are distributed substantially equally about phase quantization diagram 400. For example, bins 505, 506, 507, and 508 belong to a first group and bins 510, 511, 512, and 513 belong to a second group. Each bin may be assigned a unique k-bit codeword.

For example, each bin within a single group may be labeled with a k-bit codeword numbered according to a gray code, with m bits out of the k bits representing a group number. As shown in FIG. 5a, bins with a most significant bit equal to zero (i.e., bins 505, 506, 507, and 508) belong to the first group and bins with a most significant bit equal to one (i.e., bins 510, 511, 512, and 513) belong to the second group.

When quantizing an estimated phase, only the bins belonging to a single group are used to quantize the estimated phase. For discussion purposes, let vector 515 represent an estimated phase to be quantized and bins belonging to the first group are used to quantize vector 515. Then, vector 515 may quantize to bin 505. If a vector is on an edge of a bin, such as vector 516, then estimation error may move the vector out of its correct bin. But with groups of bins containing non-contiguous bins, even if due to estimation error, a vector moves out of its correct bin, it may be unlikely that the quantization process would result in the vector being quantized to an incorrect bin. For example, if due to estimation error, vector 516 moves into bin 511 (shown as dashed vector 517), the quantization process would still select bin 506 as the quantized representation of vector 516.

To ensure that the legitimate users are using the same group of bins to quantize the estimated phases, the m bits may be shared between the legitimate users by transmission over an error-free public channel. The m bits may herein be referred to as public information. Since the m bits are transmitted over public channels and may be intercepted by an eavesdropper, (k−m) bits remain secret for the secret key generation.

The use of groups of bins with bins arranged so that they are distributed substantially equally about the phase quantization diagram and public bits to identify the group of bins used in quantization may introduce guard bands between the bins used in the quantization of estimated phases. As the number of groups of bins (and therefore, the public bits) increases, the size of the guard bands also increases, making the quantization of estimated phases more resilient to channel estimation errors.

Figure 5B:
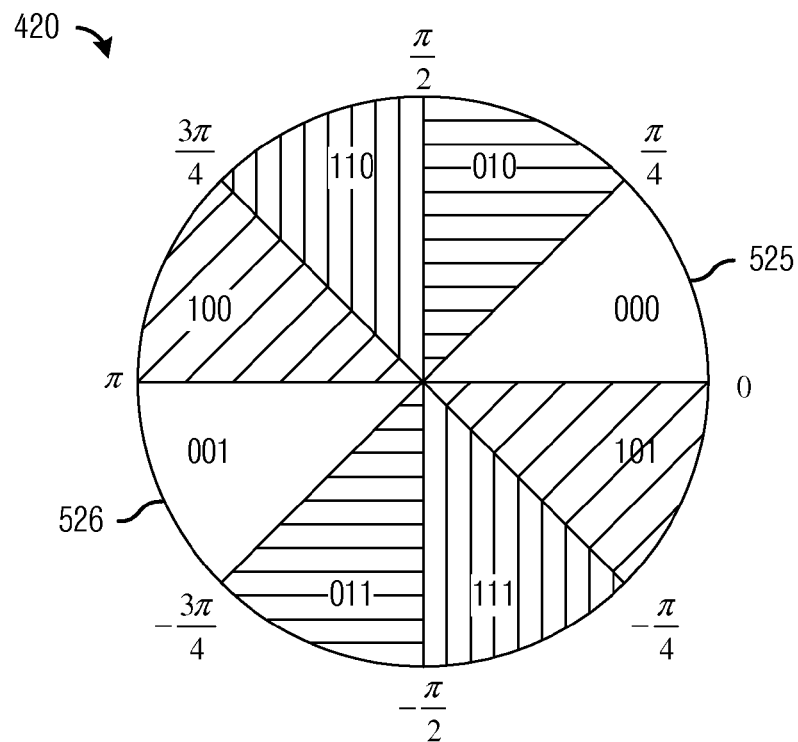
FIG. 5b is a phase quantization diagram for use in phase-based secret key generation with public communications, where k=3 and m=2.

FIG. 5b illustrates a phase quantization diagram 520 for use in phase-based secret key generation with public communications, where k=3 and m=2. Phase quantization diagram 520 includes Q=eight ($2^k$ with k=3) bins, with each bin spanning $\frac{\pi}{4}$ radians. With m=2, there are four groups of bins with 2 bins per group of bins. As in phase quantization diagram 500, the two bins per group of bins are distributed substantially equally about phase quantization diagram 520. As shown in FIG. 5*b*, similarly cross-hatched bins belong to the same group of bins. For example, bins 525 and 526 belong to the same group of bins. Also like phase quantization diagram 500, each bin may be assigned a unique k-bit codeword. However, since m=2, one bit is available for secret key generation.

Since m bits are intended for the public communication between the legitimate users, the quantization bins are mapped into $2^m$ groups of bins. Hence, each group contains $2^{k-m}$ quantization bins that are uniformly distributed and encoded by Gray coding. Based at the public bits, the eavesdropper knows which bin the secret bits are hidden in, but it does not know which codeword in the bin contains the secret bits since it observes statistically different channels. On the other hand, given the public bins and the channel estimates, the legitimate receiver is able to decode the most likely correct codeword containing the secret bits.

Although FIGS. 5*a* and 5*b* illustrate examples wherein the first m bits in each codeword are reserved for public communication. In reality, those m bits can be placed anywhere in codewords.

Figure 6:
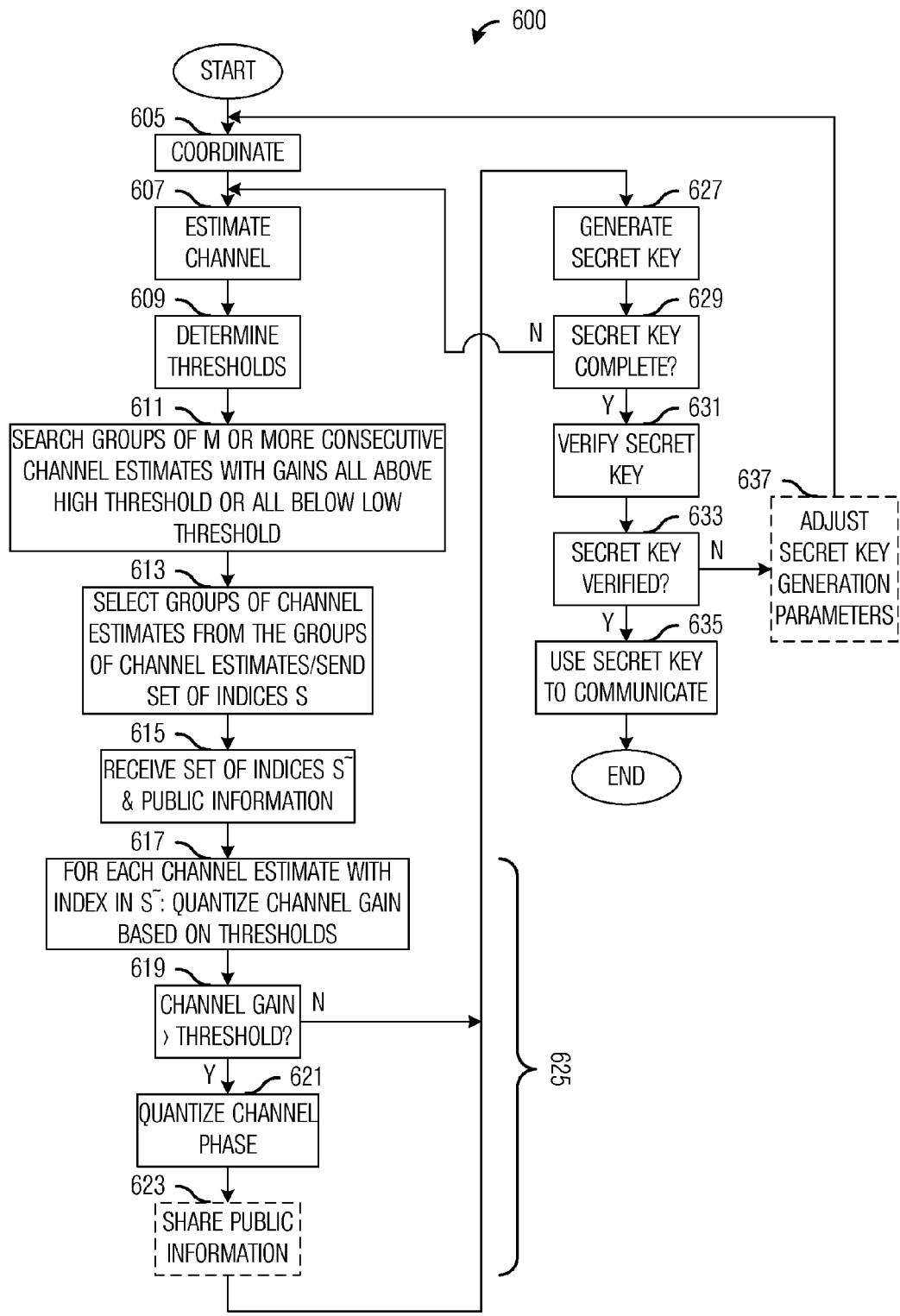
FIG. 6 is a flow diagram of user operations in generating a secret key using channel gain and/or channel phase quantization.

FIG. 6 illustrates a flow diagram of user operations 600 in generating a secret key using channel gain and/or channel phase quantization. User operations 600 may be indicative of operations occurring in a legitimate user, such as user A 205, as the legitimate user operates with another legitimate user, such as user B 210, to generate a secret key using channel gain and/or channel phase quantization of a channel between the legitimate users to produce a bit sequence for purposes of secret key generation. User operations 600 may occur while the legitimate user is in a normal operating mode.

Without loss of generality, let a first of the legitimate users be referred to as a transmitter and a second of the legitimate users be referred to as a receiver. The embodiments described herein may be operable at either legitimate user, therefore, the terms transmitter and receiver may be used to simplify notation. For example, a transmitter in a first iteration of user operations 600 may become a receiver in a second iteration of user operations 600, and vice versa.

User operations 600 may be a multi-stage operation, wither a first stage being channel estimation, a second stage being channel selection, a third stage being quantization, a fourth stage being secret key generation, and a fifth stage being key verification. User operations 600 may begin with the transmitter and the receiver coordinating (block 605). The coordinating between the legitimate users may include specifying a length of the secret key, how often to update the secret key, how often to transmit pilot signals to generate the secret key, who goes first, a configuration of a phase quantization diagram, size of public information (m), size of continuous samples (M), number of selected samples, configuration of groups of bins, and so forth. Coordination may occur each time the secret key is to be generated, at specified times, or so forth.

After coordinating, the transmitter may estimate the channel between the legitimate users using a pilot sequence transmitted by the receiver (block 607). Estimating the channel may involve the transmission of pilot signals by the receiver to allow the transmitter to estimate the channel and the transmission of pilot signals by the transmitter to allow the receiver to estimate the channel.

With the channel estimated, the transmitter may determine the thresholds, e.g., the upper threshold $q_u$ and the lower threshold $q_l$, based on the channel estimate (block 609). The upper threshold $q_u$ and the lower threshold $q_l$ may be determined based on historical information of channel estimates. For example, based on an expected value and variance of the channel estimates, the transmitter may compute the upper threshold $q_u$ and the lower threshold $q_l$.

Using the thresholds, the transmitter may search groups of M or more consecutive channel estimates that are each all above the upper threshold or all below the lower threshold (block 611). M may be an integer value agreed upon by the legitimate users during coordination and M may be set based on a variety of factors, such as desired secrecy rate, channel estimating rate, acceptable secret key bit difference rate, and so forth. The transmitter may select the channel estimates from a set of channel estimates taken during a specified time interval, with the specified time interval being determined during coordination, prespecified, or so on. A duration of the specified interval may be based on the channel estimation rate, memory size, desired performance level, etc.

From the selected groups of channel estimates, the transmitter may randomly select one or more groups and record an index of a channel estimate lying at or about the middle of each selected group. An index of a channel estimate may be related to a time instance of when the channel estimate was computed. Let S be a set of such indices. The transmitter may report the set of indices S to the receiver (block 613). The transmitter may then receive a new set of channel indices S~ from the receiver (block 615). The transmitter may also receive public information related to the public bits from the receiver if the receiver performed any channel phase quantization. According to an embodiment, the set of channel indices S~ may correspond to the indices of channel estimates made by the receiver at or around an index (or indices) in the set of channel estimate indices S provided by the transmitter. The set of indices S~ may consist of verified indices of channel estimates provided by the transmitter that correspond to channel estimates made by the receiver that either are all above the high threshold or all below the low threshold.

For each channel estimate whose index is in the set of channel indices S~, the transmitter may perform channel gain quantization (block 617). As discussed previously, the transmitter may utilize binary quantization and produce a first value, e.g., 1, for each channel estimate whose index is in the set of channel indices S~ and gain exceeds the high threshold and a second value, e.g., 0, for each channel estimate whose index is in the set of channel indices S~ and gain falls below the low threshold.

The transmitter may also perform a check to determine if channel phase quantization is to be performed (block 619). According to an embodiment, channel phase quantization is to be performed for a channel estimate if the gain of the channel estimate exceeds the high threshold. If the gain of the channel estimate exceeds the high threshold, then the transmitter may quantize the channel phase of the channel estimate (block 621). Preferably, the transmitter may use a technique for quantizing channel phase estimates with public communications as described above in FIGS. 5*a* and 5*b*. The transmitter may make use of public information provided by the receiver. If the receiver provided public information for multiple channel estimates, the transmitter may utilize only the public information corresponding to the channel estimate that it is performing phase quantization on. The transmitter may optionally share public information produced from the quantization of the channel phase estimates with the receiver (block 623). Please refer to co-assigned patent application entitled "System and Method for Securing Wireless Communications," U.S. patent application Ser. No. 12/915,521, issued on Mar. 10, 2013 as U.S. Pat. No. 8,401,193, for a detailed discussion of several channel phase quantization with public information techniques. Collectively, blocks 617-623 may form the quantization stage (the third stage).

From information produced from the quantized channel gain, channel phase, or both channel gain and phase, the transmitter may generate the secret key or a block of secret bits (block 627). Since a single quantization of the channel gain and/or channel phase may not produce enough secret information for an entire secret key, the transmitter may perform a check to determine if the secret key is complete (block 629). If the secret key is not complete, then the transmitter may return to block 607 to quantize additional channel gain and/or channel phase.

If the secret key is complete, then the transmitter may verify the secret key (block 631). As an example, a secret key verification procedure is to use a hash function. In particular, after the transmitter obtains its secret key, the transmitter may compute a hash value for the secret key, and send the hash value to the receiver. The receiver may verify whether its own hash value is similar to the hash value received from the transmitter. If both hash values are the same, then the secret keys are equal and the receiver may send an agreement acknowledgment to the transmitter, and the two secret keys become a shared secret key. Otherwise, both legitimate users must start a new secret key generation process.

Alternatively, the verification of the secret key may involve the transmitter encoding a message with the secret key and transmitting the encoded message to the receiver. The receiver may decode the encoded message with its secret key. If the decoded message is intelligible, then the legitimate users generated the same secret key.

In general, for a useful secret key, user operations 600 may need to be repeated over several coherent times to produce a secret key of desired length. The key verification may occur whenever a portion of the secret key is generated, when a specified number of portions of the secret key have been generated, or when the secret key is generated in its entirety. Performing key verification for less than the entire secret key may help to reduce a probability that the entire secret key is discarded at the expense of having to perform more key verification operations since only the portions of the secret key that does not match need be discarded.

If the secret keys are the same, the transmitter may make use of the secret key to secretly communicate with the receiver (block 635). User operations 600 may then terminate. If the secret keys are not the same, the transmitter may return to block 605 to repeat the generation of the secret key. According to an embodiment, the generation of the secret key may be repeated without making any adjustments to parameters used in generating the secret key. According to an alternative embodiment, the generation of the secret key may be repeated after adjustments to parameters used in generating the secret key have been made (block 637). Examples of adjustments may include changes to the parameters in the threshold calculation, the value of M, how often to update the secret key, how often to transmit pilot signals to generate the secret key, who goes first, a configuration of a phase quantization diagram, size of public information (m), configuration of groups of bins, and so forth.

Figure 7A:
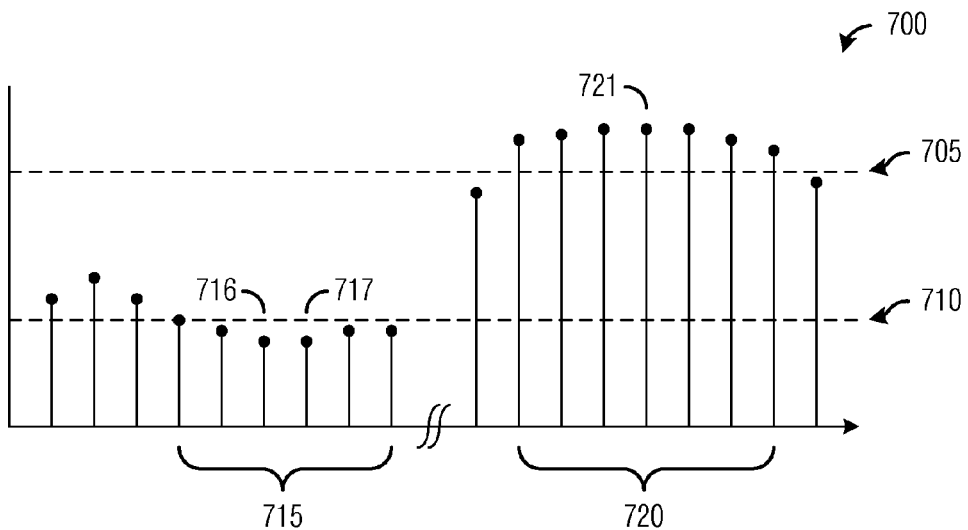
FIG. 7a is a diagram of a sequence of channel estimates at a transmitter.

FIG. 7a illustrates a sequence of channel estimates 700 at a transmitter. Sequence of channel estimates 700 may be channel estimates made at the transmitter. Also shown in FIG. 7a are two thresholds, a high threshold 705 and a low threshold 710. As discussed previously, the transmitter may select groups of channel estimates if M or more consecutive channel estimates are higher than high threshold 705 or lower than low threshold 710. Channel estimate group 715 includes six channel estimates that are all lower than (or equal to) low threshold 710. Channel estimates 716 and 717 are channel estimates at the middle or about the middle of channel estimate group 715. Similarly, channel estimate group 720 includes seven channel estimates that are all higher than high threshold 705. Channel estimate 721 is at the middle or about the middle of channel estimate group 720. The transmitter may indicate channel estimate group 715 by transmitting indices corresponding to channel estimates 716 and 717 and channel estimate group 720 by transmitting an index corresponding to channel estimate 721.

Figure 7B:
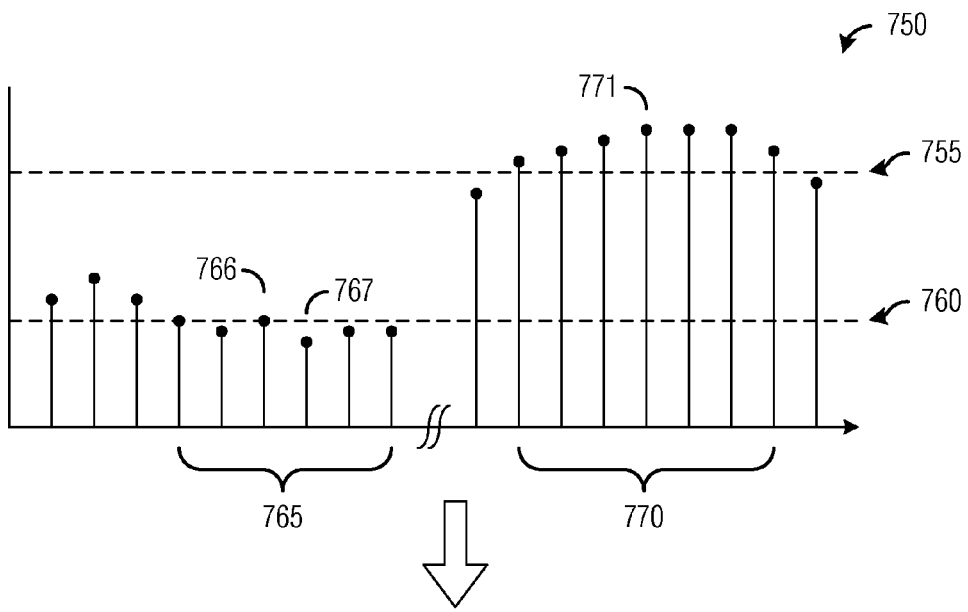
FIG. 7b is a diagram of a sequence of channel estimates at a receiver.
Figure 7B:
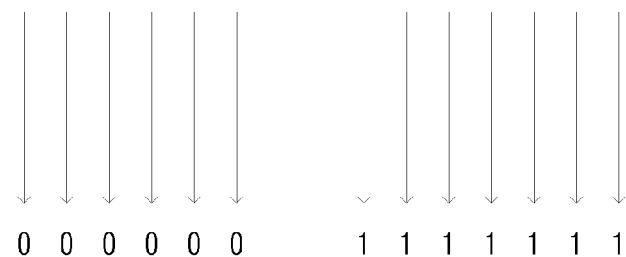

FIG. 7b illustrates a sequence of channel estimates 750 at a receiver. Sequence of channel estimates 750 may be channel estimates made at the receiver and correspond to sequence of channel estimates 700 made at a transmitter. Also shown in FIG. 7b are two thresholds, a high threshold 755 and a low threshold 760. As discussed previously, the receiver may receive indications of groups of channel estimates from the transmitter.

For example, the receiver may receive indices corresponding to channel estimates 766 and 767 to indicate group of channel estimates 765 and an index corresponding to channel estimate 771 to indicate group of channel estimate 770. The receiver may check to determine if there are at least M−1 consecutive channel estimates around the index (indices) provided by the transmitter that are all greater than high threshold 755 or less than low threshold 760. As shown in FIG. 7b, there are four channel estimates in addition to channel estimates 766 and 767 that are less than low threshold 760 and there are six channel estimates in addition to channel estimate 771 that are greater than high estimate 755.

Also shown are the quantization of the channel estimates in groups of channel estimates 765 and 770. Since the channel estimates in group of channel estimate 765 are less than low threshold 760, only the channel gain for the channel estimates is quantized, producing a sequence of 0's. However, the channel estimates in group of channel estimate 770 are greater than high threshold 755, both the channel gain and the channel phase for the channel estimates are quantized, producing a sequence of 1's as well as public and secret information.

Figure 8:
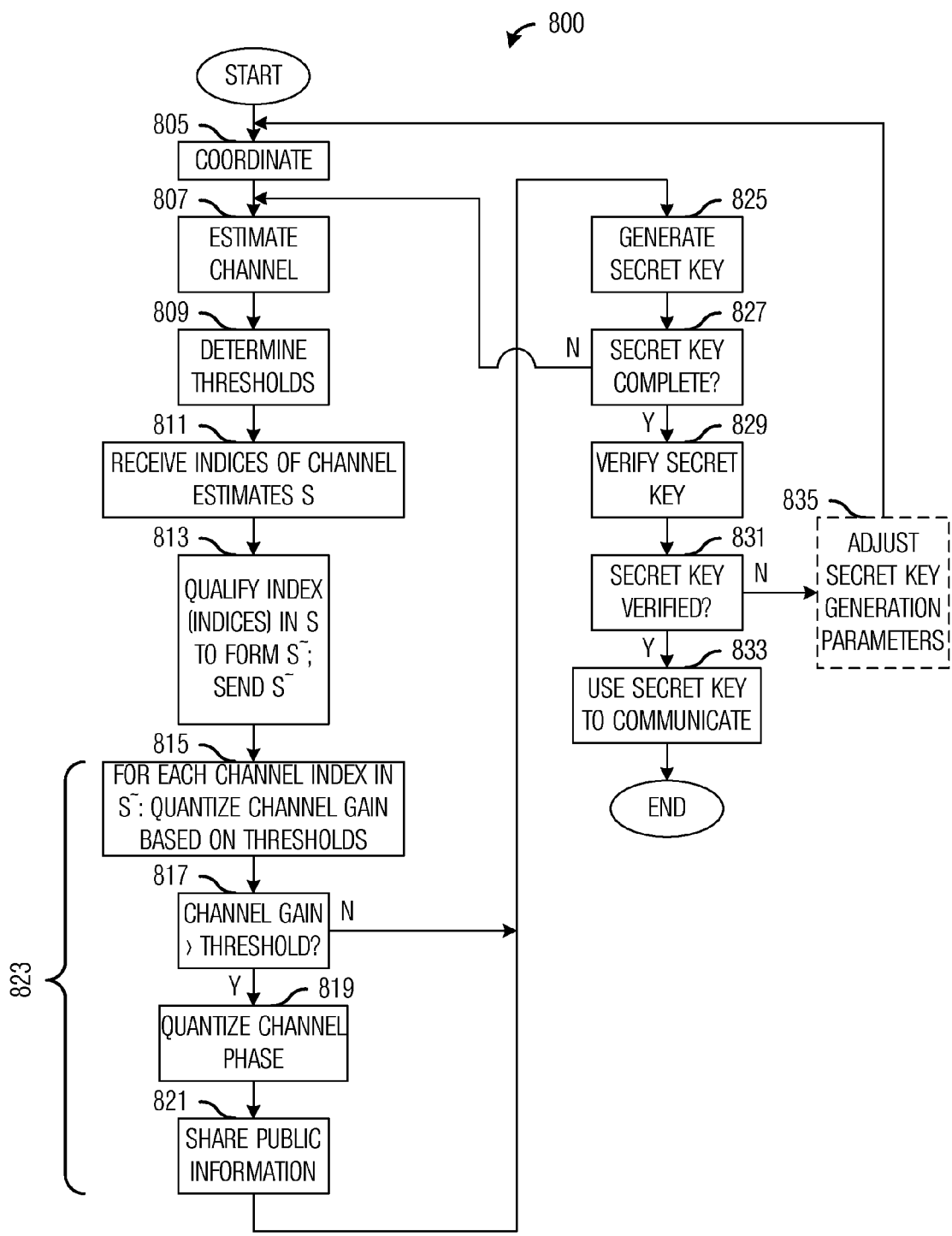
FIG. 8 is a flow diagram of user operations in generating a secret key using channel gain and/or channel phase quantization.

FIG. 8 illustrates a flow diagram of user operations 800 in generating a secret key using channel gain and/or channel phase quantization. User operations 800 may be indicative of operations occurring in a legitimate user, such as user A 205, as the legitimate user operates with another legitimate user, such as user B 210, to generate a secret key using channel gain and/or channel phase quantization of a channel between the legitimate users to produce a bit sequence for purposes of secret key generation. User operations 800 may occur while the legitimate user is in a normal operating mode.

Without loss of generality, let a first of the legitimate users be referred to as a receiver and a second of the legitimate users be referred to as a transmitter. The embodiments described herein may be operable at either legitimate user, therefore, the terms receiver and transmitter may be used to simplify notation. For example, a receiver in a first iteration of user operations 800 may become a transmitter in a second iteration of user operations 800, and vice versa.

User operations 800 may be a multi-stage operation, wither a first stage being channel estimation, a second stage being channel selection, a third stage being quantization, a fourth stage being secret key generation, and a fifth stage being key verification. User operations 800 may begin with the receiver and the transmitter coordinating (block 805). The coordinating between the legitimate users may include specifying a length of the secret key, how often to update the secret key, how often to transmit pilot signals to generate the secret key, who goes first, a configuration of a phase quantization diagram, size of public information (m), size of continuous samples (M), number of selected samples, configuration of groups of bins, and so forth. Coordination may occur each time the secret key is to be generated, at specified times, or so forth.

After coordinating, the receiver may estimate the channel between the legitimate users using a pilot sequence transmitted by the transmitter (block 807). Estimating the channel may involve the transmission of pilot signals by the transmitter to allow the receiver to estimate the channel and the transmission of pilot signals by the receiver to allow the transmitter to estimate the channel.

With the channel estimated, the receiver may determine the thresholds, e.g., the upper threshold $q_u$ and the lower threshold $q_l$, based on the channel estimate (block 809). The upper threshold $q_u$ and the lower threshold $q_l$ may be determined based on historical information of channel estimates. For example, based on an expected value and variance of the channel estimates, the receiver may compute the upper threshold $q_u$ and the lower threshold $q_l$.

The receiver may then receive indications of a subset of channel estimates S from the transmitter (block 811). According to an embodiment, the indications may comprise an index or indices of channel estimates S. For each index in S, the receiver may search in its own channel estimates to determine if at least M−1 consecutive channel estimates with gain either less than the low threshold or more than the high threshold around that index (block 813). The search through the indices of S may be referred to as qualifying the indices of S. Let S~ be a set of such indices, which may be referred to as qualified indices. The receiver may also send the set of channel indices S~ to the transmitter.

For each channel estimate whose index is in the set of channel indices S~, the receiver may perform channel gain quantization (block 815). As discussed previously, the receiver may utilize binary quantization and produce a first value, e.g., 1, for each channel estimate in S~ that exceeds the high threshold and a second value, e.g., 0, for each channel estimate in S~ that falls below the low threshold.

The receiver may also perform a check to determine if channel phase quantization is to be performed (block 817). According to an embodiment, channel phase quantization is to be performed for a channel estimate if the gain of the channel estimate exceeds the high threshold. If the gain of the channel estimate exceeds the high threshold, then the transmitter may quantize the channel phase of the channel estimate (block 819). Preferably, the receiver may use a technique for quantizing channel phase estimates with public communications as described above in FIGS. 5a and 5b. The receiver may generate both public and secret information from the quantization of the channel phase of the channel estimates and may transmit the public information to the transmitter (block 821). Collectively, blocks 815-821 may form the quantization stage (the third stage). Alternatively, rather than determining the public information from the quantization of the channel phase of the channel estimates, the receiver may determine the public information prior to the quantization of the channel phase of the channel estimates.

From information produced from the quantized channel gain, channel phase, or both channel gain and phase, the receiver may generate the secret key or a block of secret bits (block 825). Since a single quantization of the channel gain and/or channel phase may not produce enough secret information for an entire secret key, the transmitter may perform a check to determine if the secret key is complete (block 827). If the secret key is not complete, then the transmitter may return to block 807 to quantize additional channel gain and/or channel phase.

If the secret key is complete, then the transmitter may verify the secret key (block 829). As an example, a secret key verification procedure is to use a hash function. In particular, after the receiver obtains its secret key, the receiver may compute a hash value for the secret key, and send the hash value to the transmitter. The transmitter may verify whether its own hash value is similar to the hash value received from the receiver. If both hash values are the same, then the secret keys are equal and the transmitter may send an agreement acknowledgment to the receiver, and the two secret keys become a shared secret key. Otherwise, both legitimate users must start a new secret key generation process.

Alternatively, the verification of the secret key may involve the receiver encoding a message with the secret key and transmitting the encoded message to the transmitter. The transmitter may decode the encoded message with its secret key. If the decoded message is intelligible, then the legitimate users generated the same secret key.

In general, for a useful secret key, user operations 800 may need to be repeated over several coherent times to produce a secret key of desired length. The key verification may occur whenever a portion of the secret key is generated, when a specified number of portions of the secret key have been generated, or when the secret key is generated in its entirety. Performing key verification for less than the entire secret key may help to reduce a probability that the entire secret key is discarded at the expense of having to perform more key verification operations since only the portions of the secret key that does not match need be discarded.

If the secret keys are the same, the receiver may make use of the secret key to communicate with the transmitter (block 833). User operations 800 may then terminate. If the secret keys are not the same, the receiver may return to block 805 to repeat the generation of the secret key. According to an embodiment, the generation of the secret key may be repeated without making any adjustments to parameters used in generating the secret key. According to an alternative embodiment, the generation of the secret key may be repeated after adjustments to parameters used in generating the secret key have been made (block 835). Examples of adjustments may include changes to a length of the secret key, how often to update the secret key, how often to transmit pilot signals to generate the secret key, who goes first, a configuration of a phase quantization diagram, size of public information (m), configuration of groups of bins, and so forth.

Figure 9:
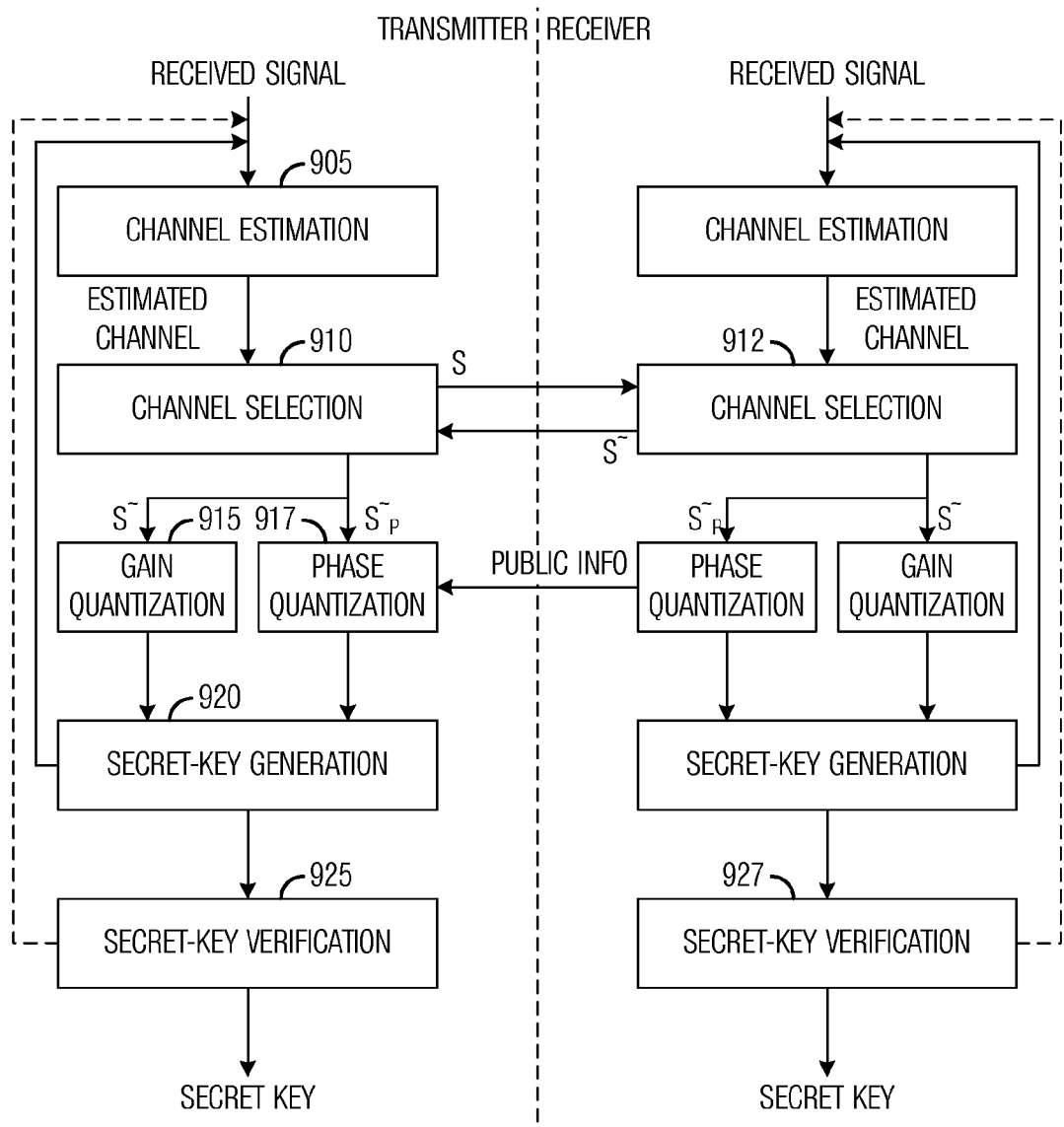
FIG. 9 is a diagram of interactions between legitimate users generating secret keys from channel gain and channel phase.

FIG. 9 illustrates interactions 900 between legitimate users generating secret keys from channel gain and channel phase. Interactions 900 may be representative of interactions between legitimate users (e.g., a transmitter and a receiver) that are using channel information (e.g., channel gain and/or channel phase) to generate secret keys for use in protecting information exchanged between the legitimate users. Interactions 900 may occur when the legitimate users are operating in a normal operating mode and are generating secret keys.

In general, interactions 900 comprise operations occurring independently at the transmitter and the receiver. The independently occurring operations may be performed by the transmitter and/or the receiver without requiring cooperation. However, on occasion, information is exchanged between the transmitter and the receiver. To ensure security of the secret key being generated, the information exchanged between the transmitter and the receiver does not compromise the secret key even if it is intercepted by an eavesdropper.

The operations occurring in the transmitter may be substantially similar to the operations occurring in the receiver. Therefore, the discussion focuses on the operations in the transmitter. Differences in operations will be noted when they occur.

The transmitter may begin with channel estimation 905. Channel estimation 905 may involve estimating characteristics of a channel between the transmitter and the receiver using a pilot signal transmitted by the receiver. Part of channel estimation 905 also includes determining a high threshold and a low threshold based on the estimated channel. According to an embodiment, the estimating of the channel may occur at periodic intervals. The channel estimates may be saved in a memory of the transmitter. Channel estimation at the receiver is substantially identical to channel estimation at the transmitter with an exception being that the transmitter transmits the pilot signal to allow the receiver to perform channel estimation.

After performing channel estimation 905, the transmitter may perform channel selection 910. Channel selection 910 may involve the transmitter selecting M or more consecutive channel estimates that have channel gains that are either greater than (or equal to) the high threshold or smaller than (or equal to) the low threshold, where M is a positive integer value that may be predetermined by the legitimate users, an operator of a communications system where the legitimate users operate, a technical standard, or so on. The transmitter may then randomly select a subset of channel estimates S from selected M or more consecutive channel estimates and transmit either S or an indication of S to the receiver. There may be more than one group of consecutive channel estimates in S.

At the receiver, after receiving S or the indication of S from the transmitter, the receiver may also perform channel selection 912. Channel selection 912 comprises the receiver checking its own channel estimates corresponding to each channel index in S or the indication of S to determine if at least M−1 consecutive channel estimates centered around the index with channel gains that are either greater than the high threshold or smaller than the low threshold. Indices meeting the criteria may be referred to as qualified indices. Then the receiver may denote S~ as a set of such qualified indices. The receiver may transmit S~ or an indication of S~ to the transmitter.

The transmitter may then perform gain quantization 915 on the channel estimates of S~. Additionally, depending on the channel gains of the channel estimates of S~, the transmitter may also perform phase quantization 917 on the channel estimates of S~. If phase quantization is performed, the receiver may send public information to the transmitter.

Information resulting from gain quantization 915 and/or phase quantization 917 may be used by the transmitter in secret key generation 920 to generate a secret key or a part of a secret key. If secret key generation 920 does not generate an entire secret key, the transmitter may need to repeat channel estimation 905, channel selection 910, gain quantization 915, phase quantization 917, and secret key generation 920 until the entire secret key is complete.

The transmitter may then perform secret key verification 925. Secret key verification 925 involves direct interaction with the receiver to verify that both the transmitter and the receiver (secret key verification 927) have generated identical secret keys. Several different secret key verification techniques have been disclosed above. Secret key verification 925 may verify the entire secret key or portions of the secret key at a time. An advantage of verifying the entire secret key may be verification overhead reduction. An advantage of verifying a portion of the secret key may be less wasted effort if the portion of the secret key does not match and must be regenerated. After secret key verification 925, both the transmitter and the receiver have identical secret keys that may be used to secure communications between the transmitter and the receiver.

Figure 10:
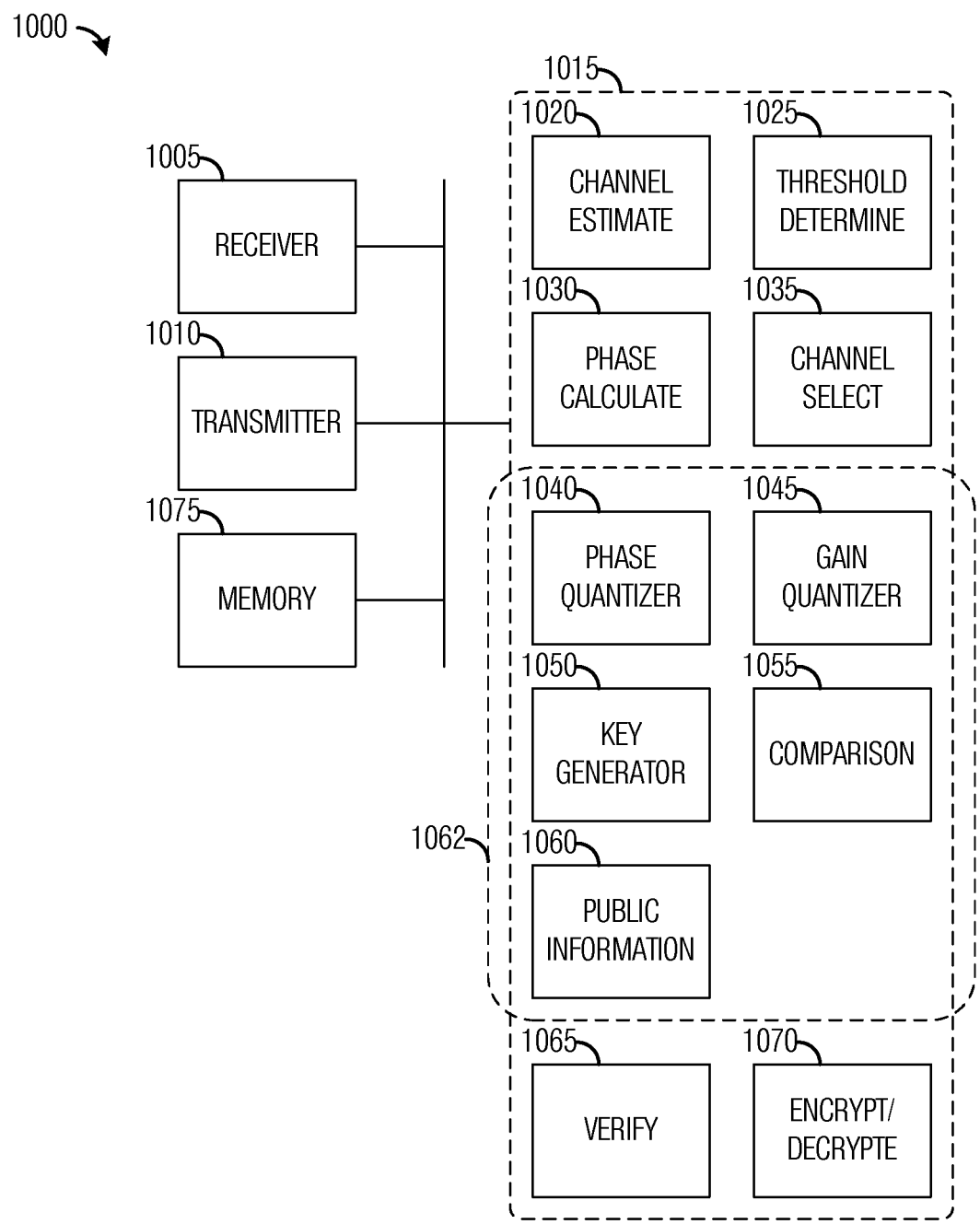
FIG. 10 is an alternate illustration of a communications device.

FIG. 10 provides an alternate illustration of a communications device 1000. Communications device 1000 may be used to implement various ones of the embodiments discussed herein. As shown in FIG. 10, a receiver 1005 is configured to receive information (such as public information and pilot signals) and a transmitter 1010 is configured to transmit information (such as public information and pilot signals).

A channel estimate unit 1020 is configured to make an estimate of a channel between communications device 1000 and another communications device based on a pilot signal transmitted by the other communications device. A threshold determine unit 1025 is configured to compute a high threshold and a low threshold from the channel estimates estimated by channel estimate unit 1020. A phase calculate unit 1030 is configured to compute an estimate of a phase of the channel based on estimates of the channel provided by channel estimate unit 1020. Alternatively, a phase calculate unit 1030 may estimate the phase of the channel directly from the received signal based on a pilot signal from the other communication device. A channel select unit 1035 is configured to select groups of M or more consecutive channel estimates with channel gains more than the high threshold or less than the low threshold. Channel select unit 1035 is also configured to randomly select groups of channel estimates from the selected groups of M or more consecutive channel estimates.

A phase quantizer unit 1040 is configured to quantize the estimate of the phase of the channel estimates provided by phase calculate unit 1030 and selected by the other communications device that is communicating with communications device 1000, wherein the quantization of the estimate of the phase makes use of a phase quantization diagram, a look up table representation of the phase quantization diagram, and potentially public information provided by the other communications device. Phase quantizer unit 1040 may quantize the channel phase only if the channel gain associated with the channel estimate exceeds the high threshold. A gain quantizer unit 1045 is configured to quantize the channel gain of the channel estimates provided by the channel estimate unit 1020 and selected by the other communications device that is communicating with communications device 1000. The quantization of the channel gain may be based on the high threshold and the low threshold.

A key generator unit 1050 is configured to generate a secret key based on the quantization of the channel phase provided by phase quantizer unit 1040 and the quantization of the channel gain provided by the gain quantizer unit 1045. According to an embodiment, the secret key may be a portion of a codeword associated with the quantization of the estimate of the phase, a function of a portion of a codeword associated with the quantization of the estimate of the phase, or a portion of a codeword associated with the quantization of the estimate of the phase. A comparison unit 1055 is configured to compare the channel gain of a channel estimate with the high threshold to determine if the channel gain of the channel estimate is to be quantized and to generate a control signal to select either gain quantization and/or phase quantization. Collectively, phase quantizer unit 1040, gain quantizer unit 1045, key generator unit 1050, comparison unit 1055, and public information unit 1060 form a key generate unit 1062.

A public information unit 1060 is configured to extract public information from the codeword associated with the quantization of the estimate of the phase. A verify unit 1065 is configured to verify a secret key generated by communications device 1000 with a secret key generated by the other communications device. An encrypt/decrypte unit 1070 is configured to encode and decode messages using the secret key. A memory 1075 is configured to store the secret key and the channel estimates.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1005 and transmitter 1010 may be implemented as specific hardware blocks, while channel estimate unit 1020, threshold determine unit 1025, phase calculate unit 1030, channel select unit 1035, phase quantizer unit 1040, gain quantizer unit 1045, key generate unit 1050, comparison unit 1055, public information unit 1060, verify unit 1065, and/or encode/decode unit 1070 may be software modules executing in a processor 1015 or custom compiled logic arrays of a field programmable logic array.

It is possible to evaluate the performance of secret key generation using gain quantization and/or phase quantization. First, a Rayleigh flat fading channel is used with a carrier frequency of 2.4 GHz. Assume MMSE channel estimators are used at the transmitter and the receiver. The estimated channel samples hence can be modeled as Equation (3.7).

Furthermore, assume that the legitimate users probe the channel at the same rate but at different times due to the half-duplex constraints of communications and hardware requirements. Specifically, TDD frame structures as specified in the 3GPP LTE technical standards are used. The probing period is 5 ms and the transmitter probes the channel 0.1 ms ahead of the receiver.

The performance of the secret key generation techniques is evaluated by the bit error probability, the secret key generation rate, and the randomness of the generated secret key. Ultimately, the performance metric is the rejection probability of an entire key. However, for a given key length, there is a fixed relationship between the key bit error probability and the key error probability (i.e., word error probability vs. bit error probability), assuming the bit error probability is i.i.d. Thus, it is useful to study the bit error probability which can be used to estimate the key error probability for any key length.

Figure 11A:
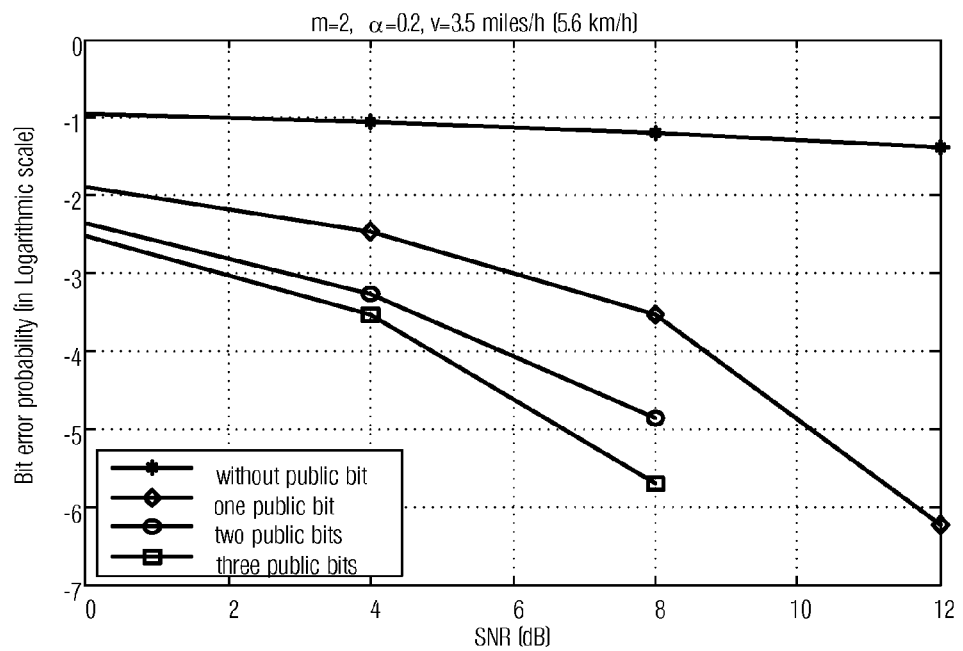
FIGS. 11a through 11i are plots of performance of secret key generation using channel gain and/or channel gain and channel phase.

FIG. 11a illustrates a plot of SNR versus bit error probability for secret key generation using only phase quantization with and without public information. As shown in FIG. 11a, the use of public information significantly improves the bit error probability compared to not using public information. Furthermore, increasing the amount of public information yields increased gains in the bit error probability.

Figure 11B:
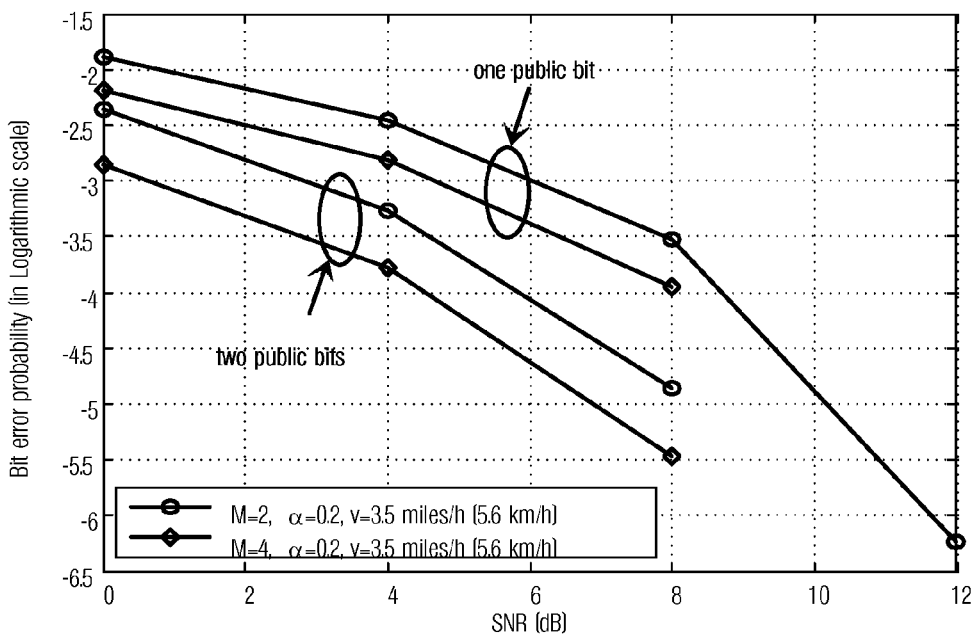

FIG. 11b illustrates plot of SNR versus bit error probability for secret key generation using only phase quantization with and without public information with different values of M (the number of consecutive channel estimates with channel gain either higher than the high threshold or lower than the low threshold). As shown in FIG. 11b, increased M significantly decreases the bit error probability. Increased M may provide greater decreases in bit error probability with larger amounts of public information.

Figure 11C:
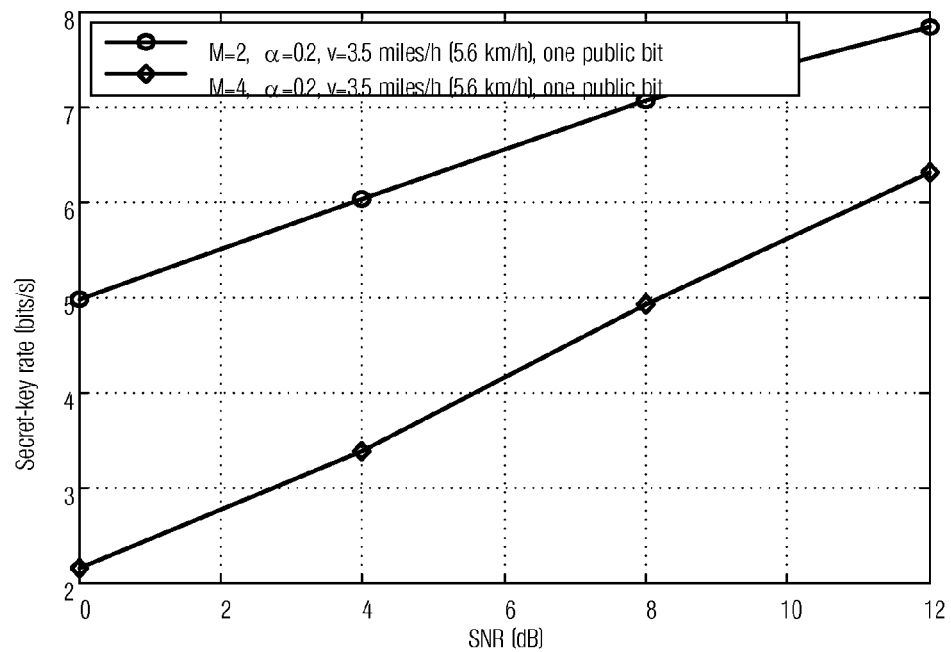

FIG. 11c illustrates a plot of SNR versus secrecy rate for different values M. As shown in FIG. 11c, increased M significantly decreases the secrecy rate since fewer channel estimates are available for quantization, and therefore, less information is available for secret key generation.

Figure 11D:
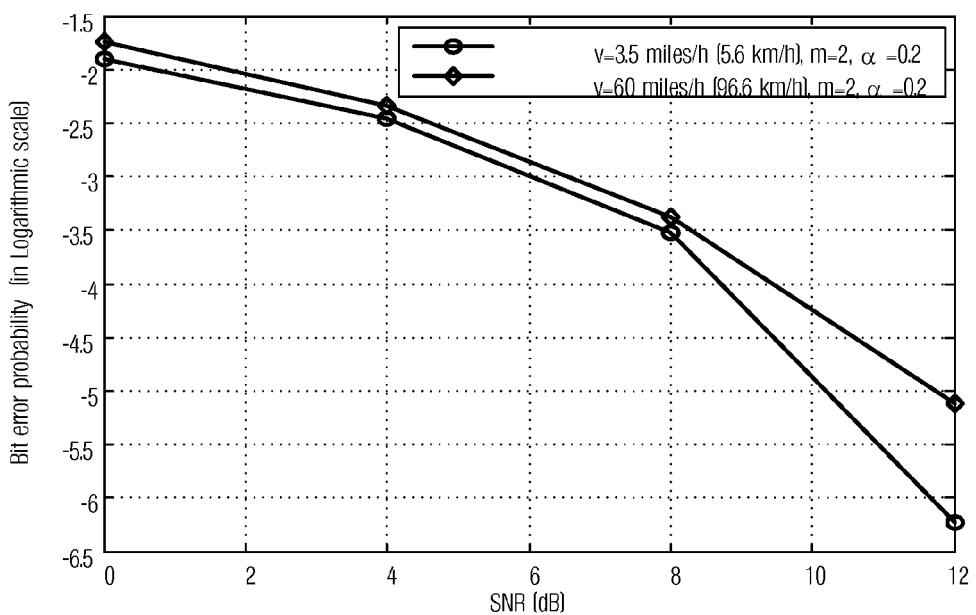

FIG. 11d illustrates a plot of SNR versus bit error probability for secret key generation using only phase quantization for legitimate users with different mobility. As shown in FIG. 11d, higher mobility legitimate users have higher bit error probabilities.

Figure 11E:
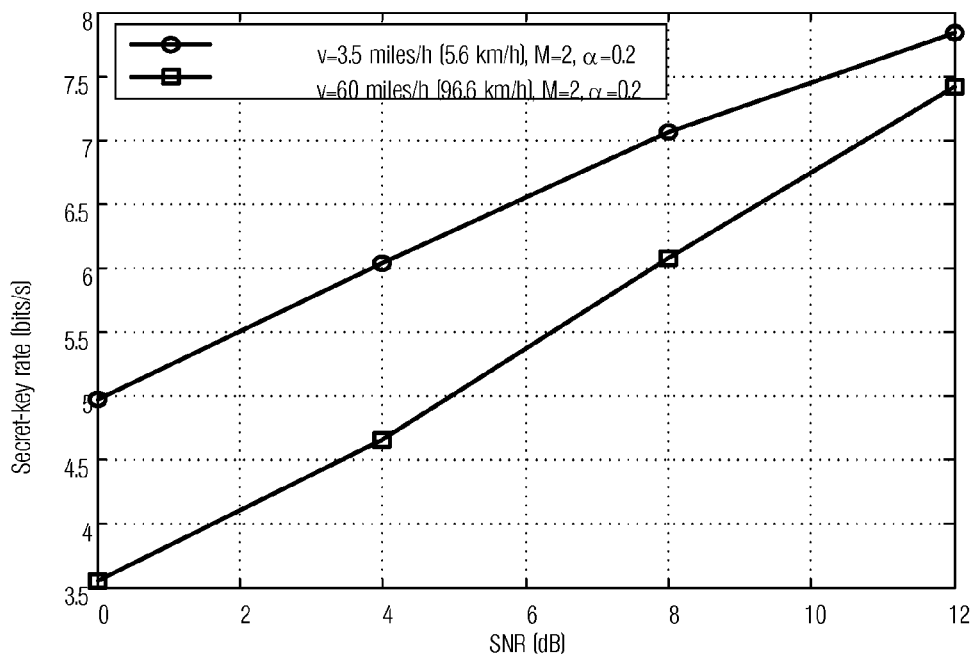

FIG. 11e illustrates a plot of SNR versus secrecy rate for legitimate users with different mobility. As shown in FIG. 11e, legitimate users with lower mobility have higher secrecy rates since the quality of the channel estimates may be better than their high mobility counterparts.

Figure 11F:
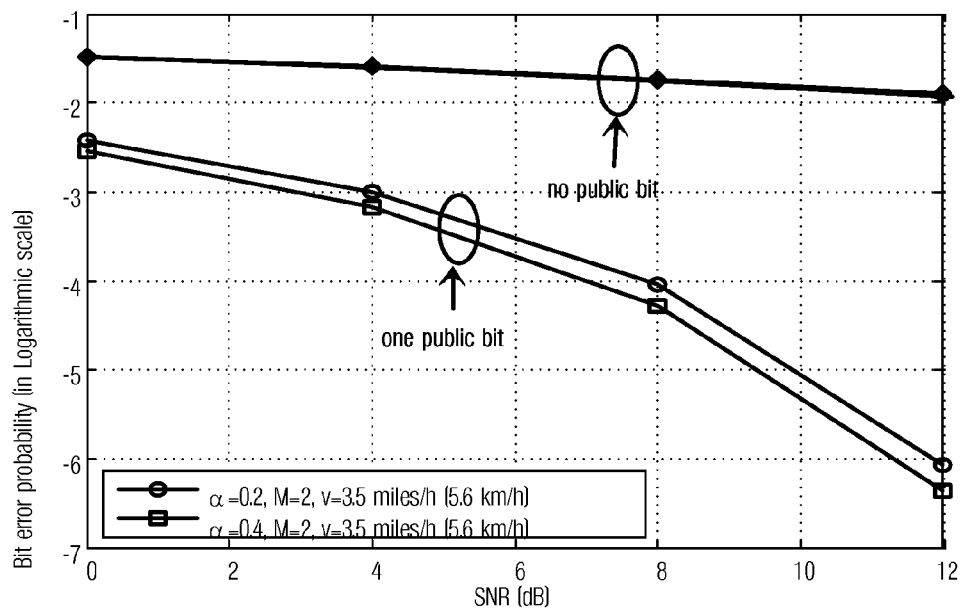

FIG. 11f illustrates a plot of SNR versus bit error probability for secret key generation using gain and/or phase quantization. As shown in FIG. 11f, the use of public information significantly decreases the bit error probability for legitimate users of differing mobility.

Figure 11G:
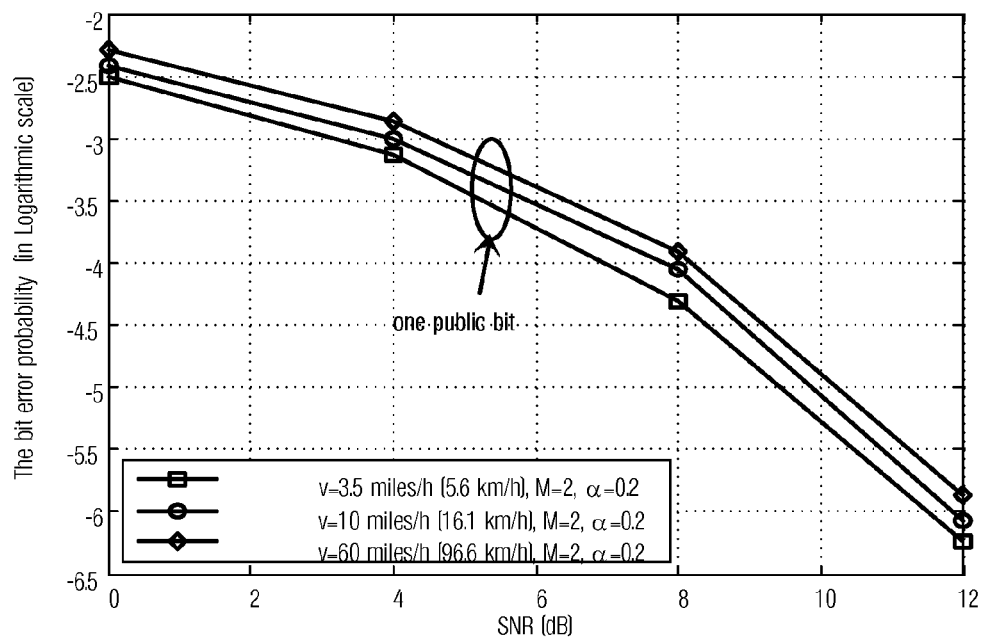

FIG. 11g illustrates a plot of SNR versus bit error probability for secret key generation using gain and/or phase quantization. As shown in FIG. 11g, legitimate users of lower mobility have better bit error probabilities.

Figure 11H:
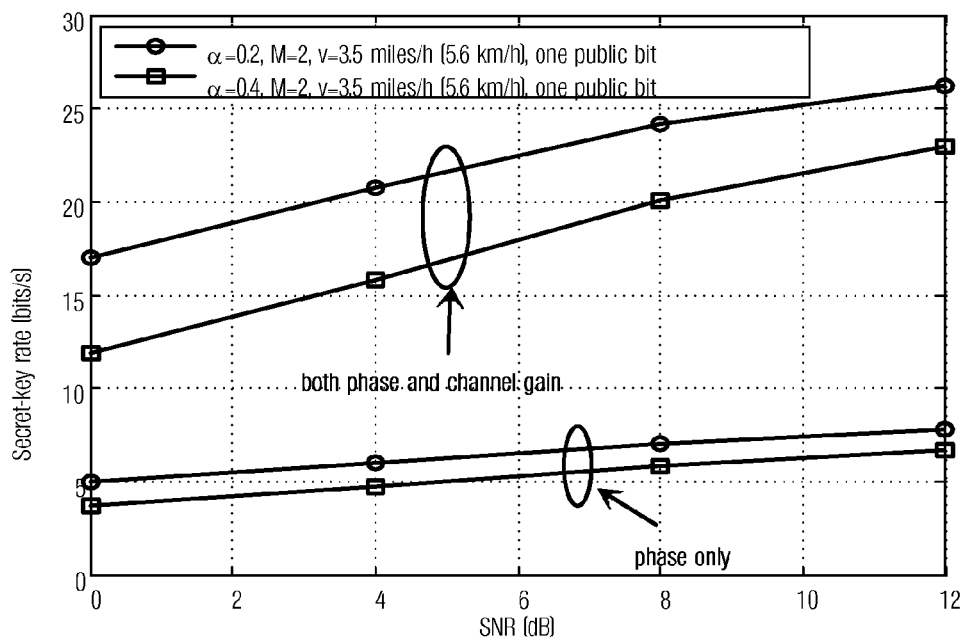

FIG. 11h illustrates a plot of SNR versus secrecy rate for legitimate users with differing mobility for secret key generation using only phase quantization or both phase and gain quantization. As shown in FIG. 11h, the use of both phase and gain quantization to generate a secret key may substantially increase the secrecy rate for legitimate users of different mobility.

Figure 11I:
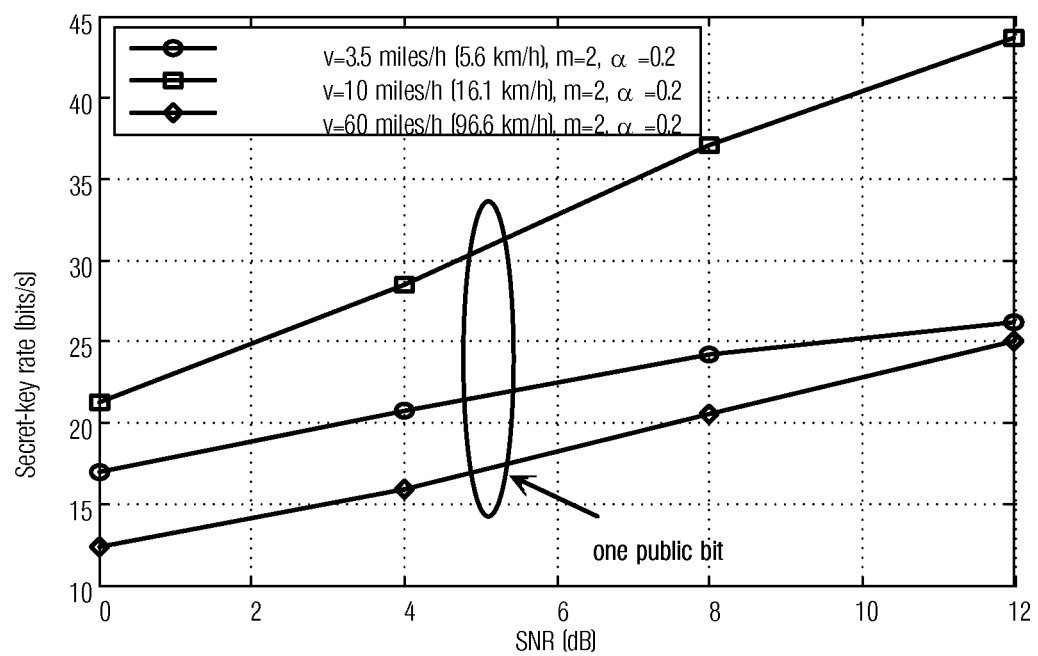

FIG. 11i illustrates a plot of SNR versus secrecy rate for legitimate users with different mobility. As shown in FIG. 11i, legitimate users with high mobility have lower secrecy rates than legitimate users with low and medium mobility.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for secure communications by a first user, the method comprising:
    estimating, by a processor, a channel between the first user and a second user, thereby producing a first channel estimate comprising a first gain estimate and a first phase estimate of the channel;
    determining, by the processor, first public information, comprising:

selecting a set of one or more time instances from which the first user produces the first channel estimate, wherein selecting the set of one or more time instances comprises:
   determining a first threshold and a second threshold;
   selecting a set of channel estimates, wherein the set of channel estimates comprises M or more consecutive channel estimates with gain estimates that are all less than the first threshold or all more than the second threshold, where M is a positive integer value; and
   selecting time instances corresponding to the selected set of channel estimates; and
   setting an indicator of the selected set of one or more time instances as the first public information;
transmitting, by a transmitter, the first public information regarding the first channel estimate to the second user;
determining, by the processor, whether to use only the first gain estimate to generate a first block of secret bits, or to use both the first gain estimate and the first phase estimate to generate the first block of secret bits; and
generating, by the processor, the first block of secret bits using the first channel estimate,
   wherein the generating comprises using the first gain estimate without the first phase estimate to generate the first block of secret bits, when the first gain estimate is less than the first threshold, and
   wherein the generating comprises using the first gain estimate and the first phase estimate to generate the first block of secret bits, when the first gain estimate is more than the second threshold, wherein the first threshold is lower than the second threshold.

2. The method of claim 1, wherein determining the first public information further comprises:
   selecting a group of phase quantization bins from a plurality of groups of phase quantization bins; and
   selecting an indicator of the selected group of phase quantization bins as an additional component of the first public information.

3. The method of claim 1, wherein generating a first block of secret bits comprises for each channel estimate in the selected set of channel estimates, quantizing the channel estimate using a relationship between a gain estimate of the channel estimate and the first threshold and the second threshold to produce the first block of secret bits.

4. The method of claim 3, wherein quantizing the channel estimate comprises:
   determining if the gain estimate of the channel estimate is less than the first threshold or if the gain estimate of the channel estimate is more than the second threshold;
   quantizing the gain estimate of the channel estimate without the phase estimate of the channel estimate to produce the first block of secret bits when the gain estimate of the channel estimate is less than the first threshold; and
   quantizing the gain estimate of the channel estimate and a phase estimate of the channel estimate to produce the first block of secret bits when the gain estimate of the channel estimate is more than the second threshold.

5. The method of claim 4, wherein quantizing the phase estimate of the channel estimate comprises:
   selecting a group of phase quantization bins from a plurality of groups of phase quantization bins;
   mapping the phase estimate of the channel to a codeword, wherein the codeword is associated with a quantization bin in the selected group of phase quantization bins; and
   selecting at least a portion of the codeword as part of the first block of secret bits.

6. The method of claim 1, further comprising receiving a second public information from the second user, and wherein the generating the first block of secret bits further comprises using the second public information.

7. The method of claim 6, wherein the second public information comprises a subset of the first public information.

8. The method of claim 7, wherein the second public information comprises one or more time instances where the second user selects to generate a second block of secret bits.

9. The method of claim 8, wherein the second user generates a second block of secret bits using a second channel estimate, wherein the second channel estimate comprises a second gain estimate and a second phase estimate.

10. The method of claim 8, wherein the generating the first block of secret bits comprises generating the first block of secret bits within time instances of the second public information.

11. A method for secure communications by a second user, the method comprising:
   receiving, by a receiver, a first public information from a first user, the first public information determined by:
   selecting a set of one or more time instances from which the first user produces a first channel estimate, wherein selecting the set of one or more time instances comprises:
      determining a first threshold and a second threshold;
      selecting a set of channel estimates, wherein the set of channel estimates comprises M or more consecutive channel estimates with gain estimates that are all less than the first threshold or all more than the second threshold, where M is a positive integer value; and
      selecting time instances corresponding to the selected set of channel estimates; and
      setting an indication of the selected set of one or more time instances as the first public information;
   estimating, by a processor, a channel between the second user and the first user, thereby producing a second channel estimate comprising a second gain estimate and a second phase estimate of the channel;
   determining, by the processor, whether to use only the second gain estimate to generate a second block of secret bits, or to use both the second gain estimate and the second phase estimate to generate the second block of secret bits; and
   generating, by the processor, the second block of secret bits using the first public information and the second gain estimate and the second phase estimate of the channel,
      wherein the generating comprises using the second gain estimate without the second phase estimate to generate the second block of secret bits, when the second gain estimate is less than the first threshold, and
      wherein the generating comprises using the second gain estimate and the second phase estimate to generate the second block of secret bits, when the second gain estimate is more than the second threshold, wherein the first threshold is lower than the second threshold.

12. The method of claim 11, wherein the second user produces a second public information using the second channel estimate, and transmits the second public information to the first user.

13. The method of claim 12, wherein the generating the second block of secret bits is using the second public information.

14. The method of claim 11, wherein the indication of the selected set of one or more time instances indicate when the second user performs the channel estimation.

15. The method of claim 13, wherein the generating a second block of secret bits comprises:
  determining the first threshold and the second threshold; and
  quantizing a set of channel estimates indicated by the second public information using a relationship between a gain estimate of the channel estimate and the first threshold and the second threshold to produce the second block of secret bits.

16. The method of claim 15, wherein quantizing a set of channel estimates indicated by the second public information using a relationship between a gain estimate of the channel estimate and the first threshold and the second threshold comprises:
  determining if the gain estimate of the channel estimate is less than the first threshold or if the gain estimate of the channel estimates is more than the second threshold;
  quantizing the gain estimate of the channel estimate without the phase estimate of the channel estimate when the gain estimate of the channel estimate is less than the first threshold; and
  quantizing the gain estimate of the channel estimate and a phase estimate of the channel estimate when the gain estimate of the channel estimate is more than the second threshold.

17. The method of claim 16, wherein quantizing the phase estimate of the channel estimate comprises:
  selecting a group of phase quantization bins from a plurality of groups of phase quantization bins;
  mapping the phase estimate of the channel to a codeword, wherein the codeword is associated with a quantization bin in the selected group of phase quantization bins; and
  selecting all or a portion of the codeword as part of the second block of secret bits.

18. A first communications device comprising:
  a non-transitory memory containing instructions; and
  a processor coupled to the memory for executing the instructions, the instructions comprising:
  channel estimate instructions for estimating a channel between the first communications device and a remote communications device;
  threshold instructions for determining one or more thresholds using the channel estimate;
  channel select instructions for:
    selecting a set of one or more time instances from which the channel estimate unit produces the channel estimate, wherein the instructions for selecting the set of one or more time instances comprise instructions for:
      selecting a set of channel estimates, wherein the set of channel estimates comprises M or more consecutive channel estimates with gain estimates that are all less than a first threshold or all more than a second threshold, where M is a positive integer value; and
      selecting time instances corresponding to the selected set of channel estimates; and
    setting an indicator of the selected set of one or more time instances as first public information; and
  key generate instructions for:
    generating secret bits using a gain of the channel estimate and a phase of the channel estimate;
    determining whether to use only the gain of the channel estimate to generate the secret bits, or to use both the gain of the channel estimate and the phase of the channel estimate to generate the secret bits;
    using the gain of the channel estimate without the phase of the channel estimate to generate the secret bits, when the gain of the channel estimate is less than the first threshold; and
    using the gain of the channel estimate and the phase of the channel estimate to generate the secret bits, when the gain of the channel estimate is more than the second threshold, wherein the first threshold is lower than the second threshold.

19. The first communications device of claim 18, wherein the key generate instructions comprise instructions for generating the secret bits using a relationship between a gain of the channel estimate and the one or more thresholds.

20. The first communications device of claim 19, wherein the key generate unit comprises instructions comprise instructions for:
  quantizing a phase of a channel estimate;
  quantizing a gain of a channel estimate;
  generating the secret bits using a codeword produced by the quantizing of the phase and/or gain of the channel estimate; and
  comparing the gain of the channel estimate with the one or more thresholds and to generate a control signal using the comparison.

21. The first communications device of claim 18, wherein the non-transitory memory contains encrypt/decrypt unit instructions for encoding transmissions to the remote communications device with the secret bits.

22. The first communications device of claim 18, wherein the key generate instructions comprise instructions for selecting a group of phase quantization bins from a plurality of groups of phase quantization bins, mapping a first phase estimate of the channel to a codeword, wherein the codeword is associated with a quantization bin in a selected group of phase quantization bins, and selecting at least a portion of the codeword as a part of the secret bits.

23. A first device for secure communications, the first device comprising:
  a non-transitory memory containing instructions; and
  a processor coupled to the memory for executing the instructions, wherein the instructions comprise:
  channel estimator instructions for estimating a channel between the first device and a second device, thereby producing a first channel estimate comprising a first gain estimate and a first phase estimate of the channel;
  determining instructions for determining first public information by:
    selecting a set of one or more time instances from which the first device produces the first channel estimate, wherein selecting the set of one or more time instances comprises
      determining a first threshold and a second threshold;
      selecting a set of channel estimates, wherein the set of channel estimates comprises M or more consecutive channel estimates with gain estimates that are all less than the first threshold or all more than the second threshold, where M is a positive integer value; and
      selecting time instances corresponding to the selected set of channel estimates; and
    setting an indicator of the selected set of one or more time instances as the first public information;
  generator instructions for:
    generating a first block of secret bits using the first channel estimate;
    determining whether to use only the first gain estimate to generate the first block of secret bits, or to use both the first gain estimate and the first phase estimate to generate the first block of secret bits;

using the first gain estimate without the first phase estimate to generate the first block of secret bits, when the first gain estimate is less than the first threshold; and using the first gain estimate and the first phase estimate to generate the first block of secret bits, when the first gain estimate is more than the second threshold, wherein the first threshold is lower than the second threshold; and a transmitter for transmitting the first public information regarding the first channel estimate to the second device.

24. The first device of claim 23, wherein the determining instructions comprise instructions for determining the first public information by selecting a set of one or more time instances from which the first device produces the first channel estimate and setting an indicator of the selected set of one or more time instances as the first public information.

25. The first device of claim 24, wherein the determining instructions comprise instructions for determining the first public information by selecting a group of phase quantization bins from a plurality of groups of phase quantization bins and selecting an indicator of the selected group of phase quantization bins as an additional component of the first public information.

26. The first device of claim 24, further comprising a receiver for receiving a second public information from the second device, and wherein the generator instructions comprise instructions for generating the first block of secret bits using the second public information.

27. A first device for secure communications, the first device comprising:

a receiver for receiving a first public information from a second device, the first public information determined by:

selecting a set of one or more time instances from which the second device produces a first channel estimate, wherein selecting the set of one or more time instances comprises determining a first threshold and a second threshold;

selecting a set of channel estimates, wherein the set of channel estimates comprises M or more consecutive channel estimates with gain estimates that are all less than the first threshold or all more than the second threshold, where M is a positive integer value; and selecting time instances corresponding to the selected set of channel estimates; and setting an indication of the selected set of one or more time instances as the first public information;

a non-transitory memory containing instructions; and a processor coupled to the memory for executing the instructions, the instructions comprising:

channel estimator instructions for estimating a channel between the second device and the first device, thereby producing a second channel estimate comprising a second gain estimate and a second phase estimate of the channel; and generator instructions for:

generating a second block of secret bits using the first public information and the second gain estimate and the second phase estimate of the channel;

determining whether to use only the second gain estimate to generate the second block of secret bits, or to use both the second gain estimate and the second phase estimate to generate the second block of secret bits;

using the second gain estimate without the second phase estimate to generate the second block of secret bits, when the second gain estimate is less than the first, threshold; and using the second gain estimate and the second phase estimate to generate the second block of secret bits, when the second gain estimate is more than the second threshold, wherein the first threshold is lower than the second threshold.

28. The first device of claim 27, wherein the non-transitory memory contains information producer instructions for producing a second public information using the second channel estimate, the second public information to be transmitted to the second device.

29. The first device of claim 27, wherein the an indication of the set of one or more time instances indicates when the channel estimator performs the channel estimation.

* * * * *

UNITED STATES PATENT AND TRADEMARK OFFICE
CERTIFICATE OF CORRECTION

PATENT NO. : 8,744,082 B2
APPLICATION NO. : 12/938841
DATED : June 3, 2014
INVENTOR(S) : Hung D. Ly It is certified that error appears in the above-identified patent and that said Letters Patent is hereby corrected as shown below:

In the Claims

In Col. 24, line 40, claim 29, after "wherein" delete "the".

Signed and Sealed this
Ninth Day of December, 2014

Michelle K. Lee
*Deputy Director of the United States Patent and Trademark Office*